(12) United States Patent
Lentzitzky et al.

(10) Patent No.: US 10,194,212 B2
(45) Date of Patent: Jan. 29, 2019

(54) SYSTEMS AND METHODS FOR PROVIDING FLEXIBLE ACCESS TO SCENES CONTAINED WITHIN A VIDEO CONTENT ITEM

(71) Applicant: COMIGO LTD., Yarkona (IL)

(72) Inventors: Motty Lentzitzky, Tel Aviv (IL); Menahem Lasser, Kohav-Yair (IL)

(73) Assignee: Comigo Ltd., Yarkona (IL)

( * ) Notice: Subject to any disclaimer, the term of this patent is extended or adjusted under 35 U.S.C. 154(b) by 0 days.

(21) Appl. No.: 15/640,546

(22) Filed: Jul. 2, 2017

(65) Prior Publication Data

US 2018/0070150 A1  Mar. 8, 2018

Related U.S. Application Data

(60) Provisional application No. 62/383,616, filed on Sep. 6, 2016.

(51) Int. Cl.
*H04N 21/6587* (2011.01)
*H04N 21/472* (2011.01)
*H04N 21/61* (2011.01)
*H04N 21/845* (2011.01)

(52) U.S. Cl.
CPC ... *H04N 21/6587* (2013.01); *H04N 21/47217* (2013.01); *H04N 21/6125* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 5,703,655 A | 12/1997 | Corey et al. | |
| 8,726,316 B2 * | 5/2014 | Gambino | G06Q 30/0277 709/231 |
| 9,077,956 B1 * | 7/2015 | Morgan | H04N 9/8205 |
| 9,141,860 B2 | 9/2015 | Vunic et al. | |
| 2002/0041756 A1 * | 4/2002 | Kato | G11B 27/034 386/330 |
| 2009/0307741 A1 | 12/2009 | Casagrande | |
| 2014/0099034 A1 | 4/2014 | Rafati et al. | |

OTHER PUBLICATIONS

Automatic video scene segmentation based on spatial-temporal clues and rhythm; https://arxiv.org/abs/1412.4470; published in 2002.
Content-Based Movie Analysis and Indexing Based on AudioVisual Cues; published in 2004; Ying Lee et al; IEEE Transactions on Circuits and Systems for Video Technology, vol. 14, No. 8; Aug. 2004.
Constructing Table-of-Content for Videos; Yong Rui et al; Beckman Institute for Advanced Science and Technology; published 1999.

* cited by examiner

*Primary Examiner* — Cai Y Chen
(74) *Attorney, Agent, or Firm* — Marc Van Dyke; Fourth Dimension IP

(57) ABSTRACT

Devices, systems, and methods for providing flexible access to video scenes contained within a video content item by receiving a scene information collection relating to the video scenes in the video content item and providing a user interface enabling a user to select a scene based on the scene information collection.

4 Claims, 11 Drawing Sheets

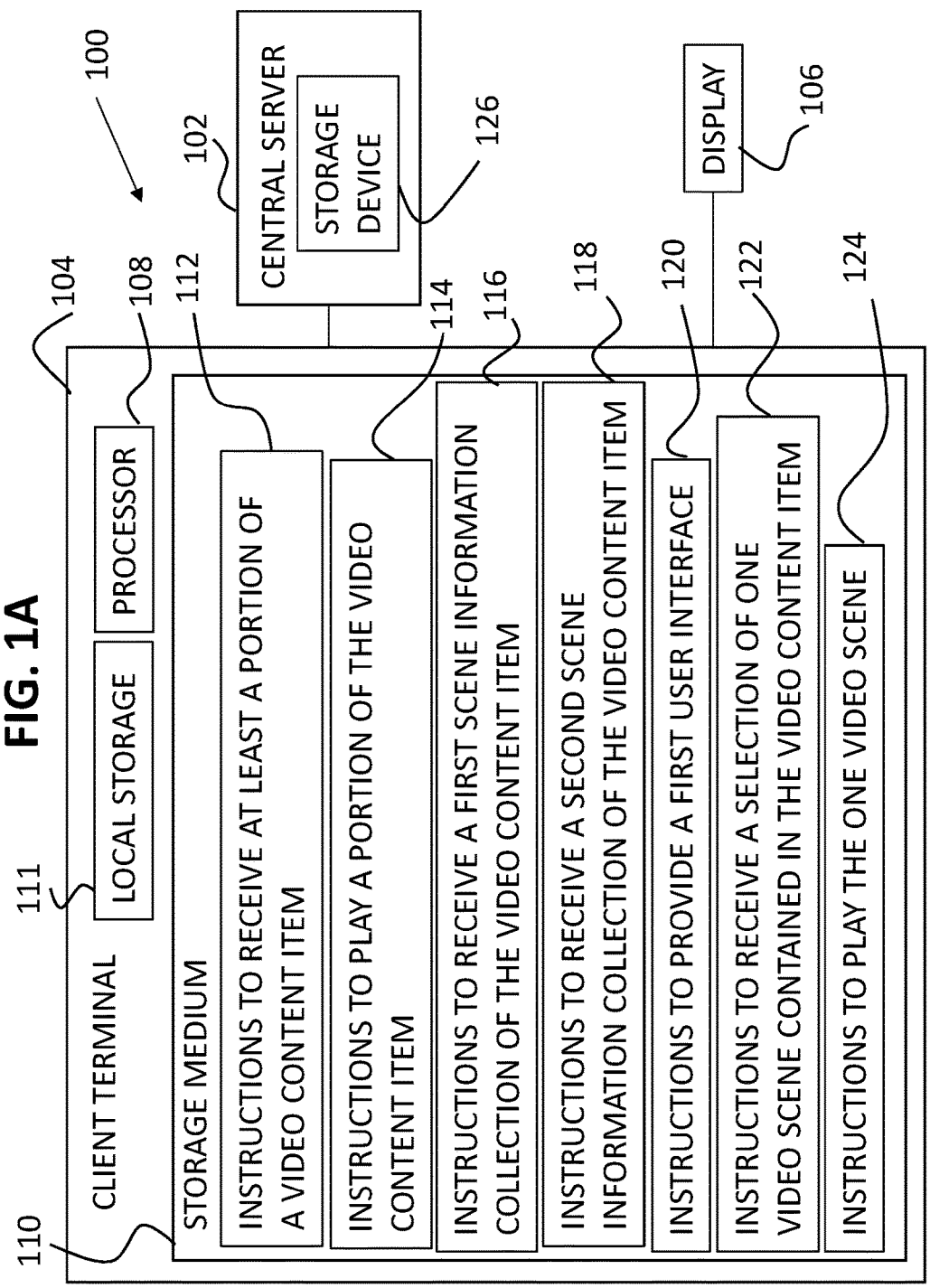

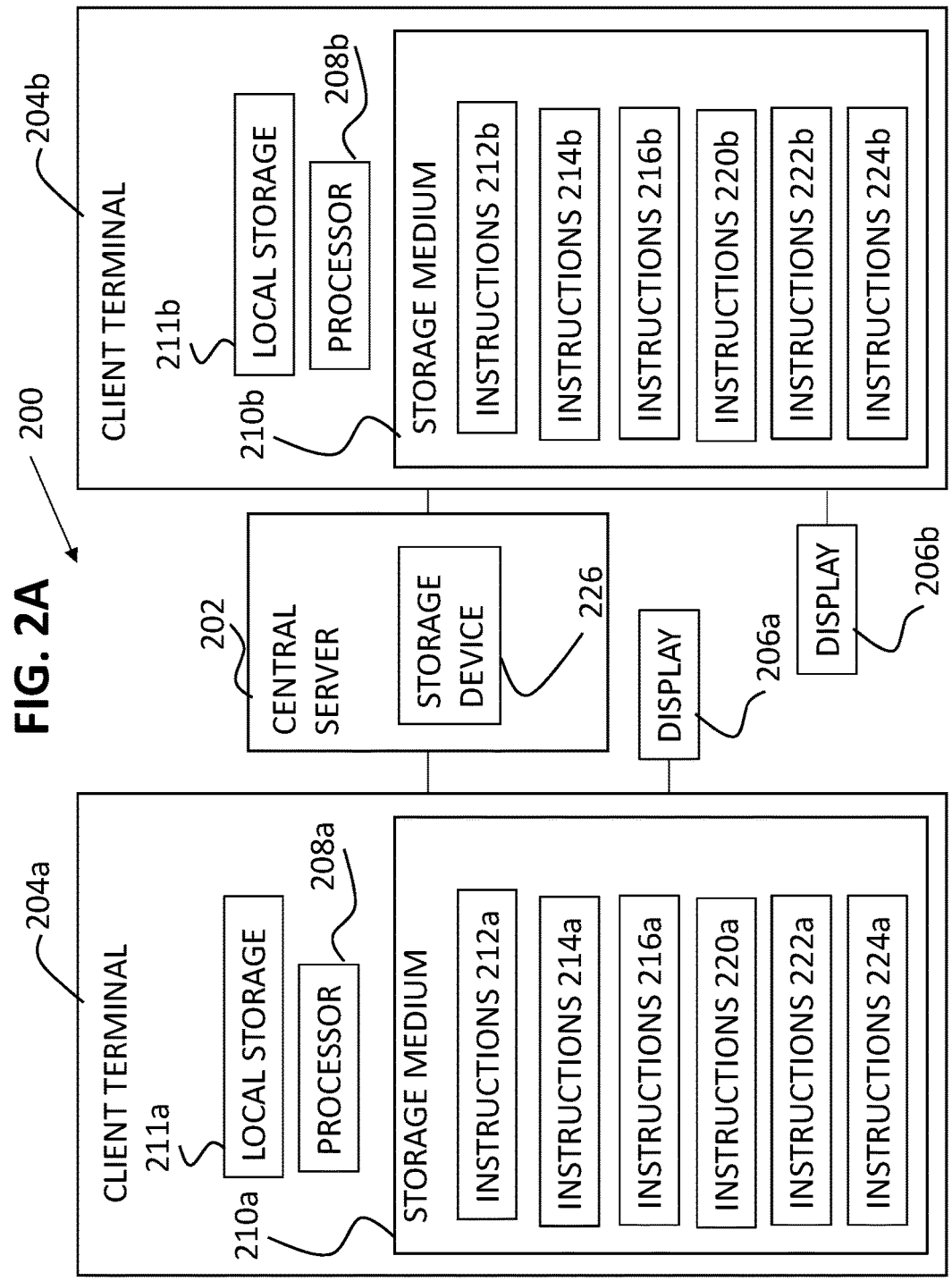

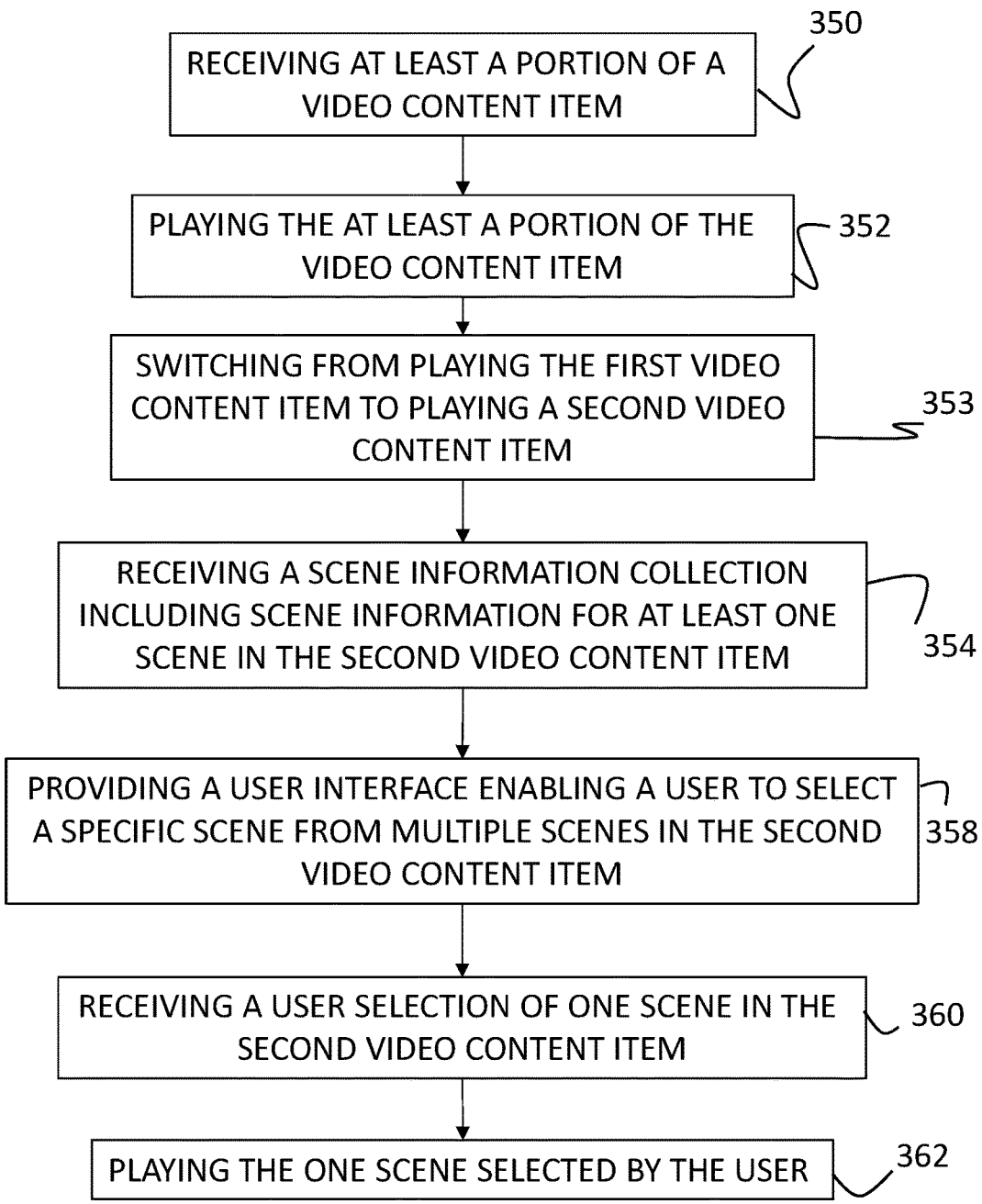

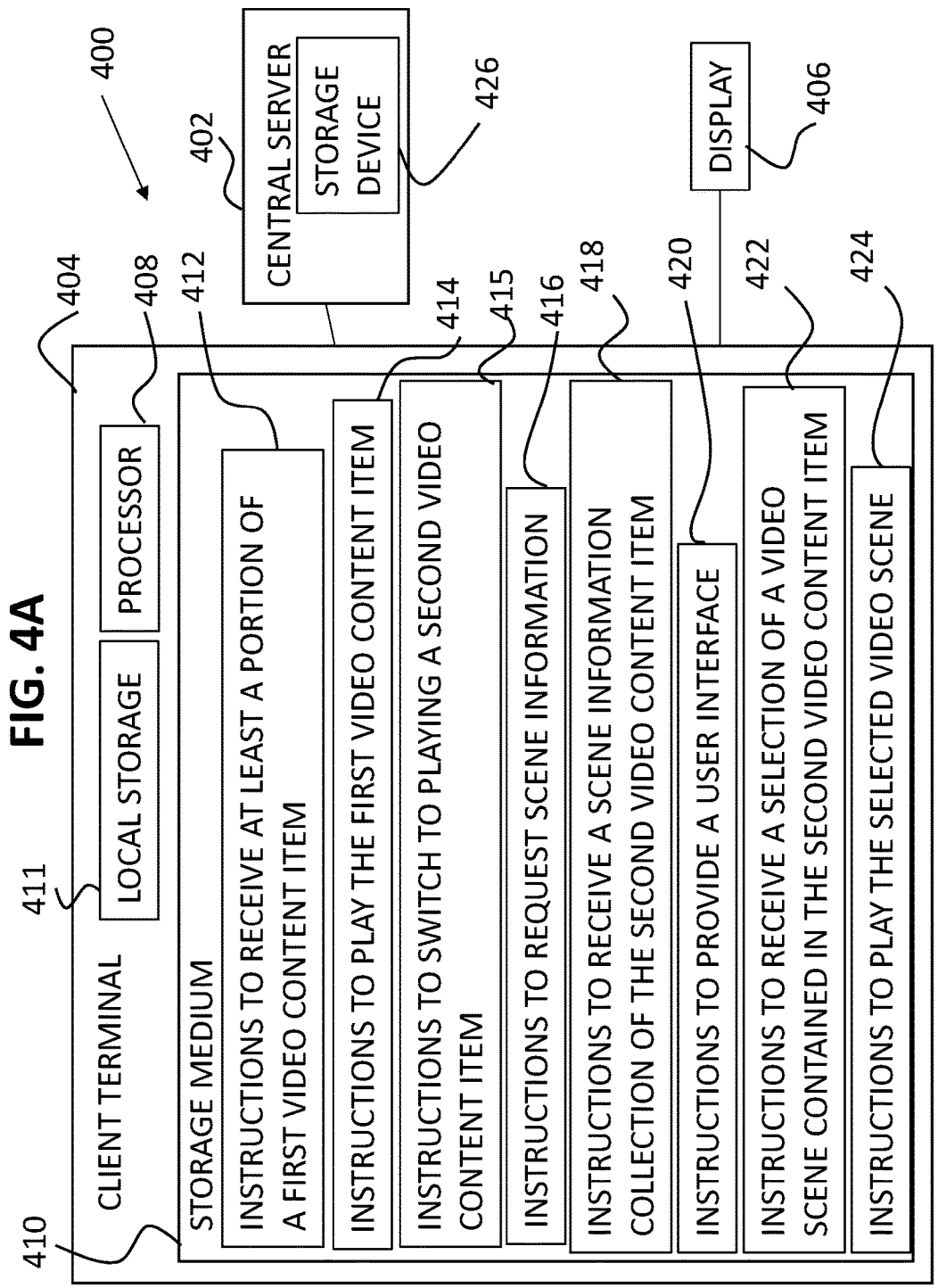

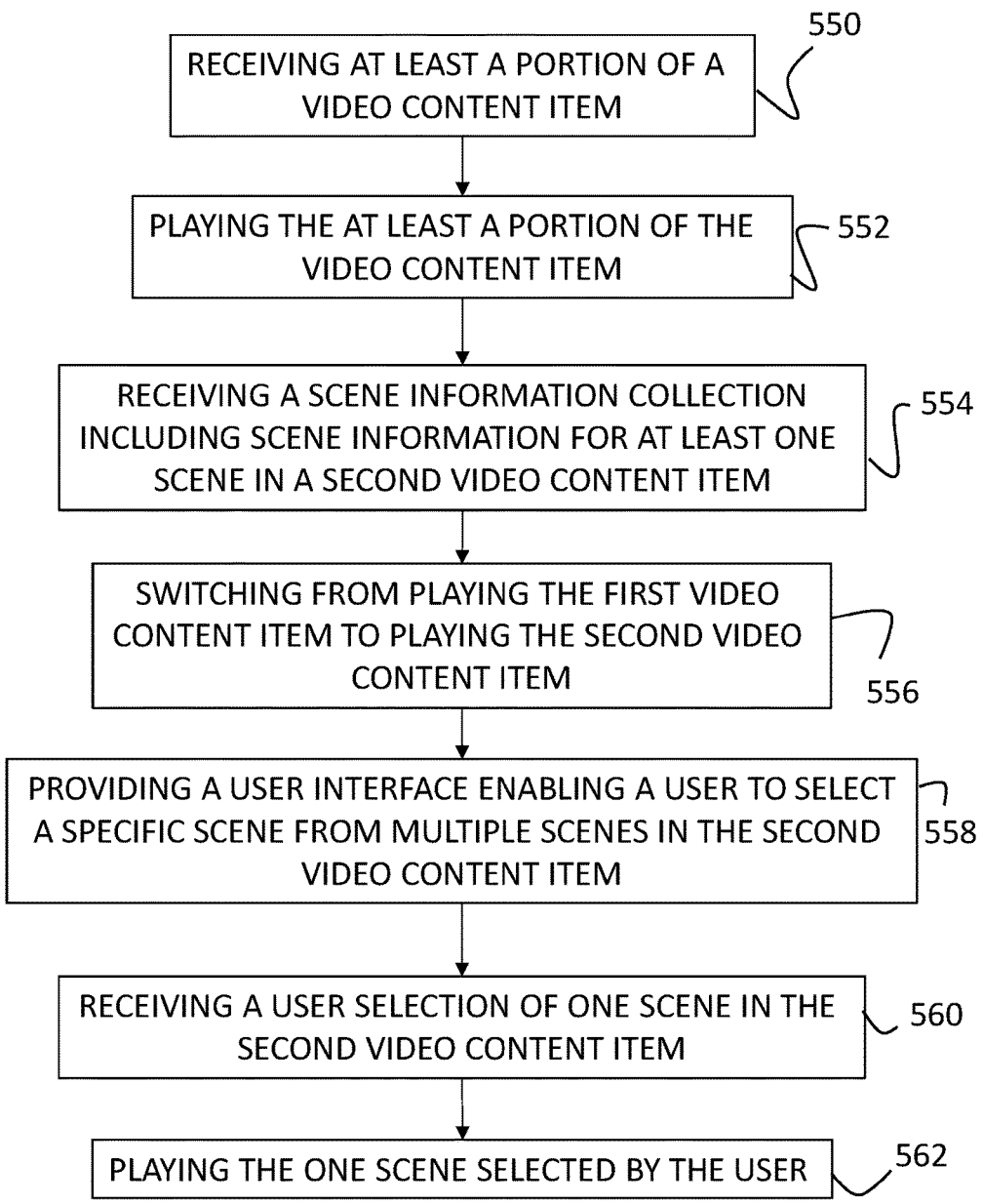

SYSTEMS AND METHODS FOR PROVIDING FLEXIBLE ACCESS TO SCENES CONTAINED WITHIN A VIDEO CONTENT ITEM

RELATED APPLICATION

The present application gains priority from U.S. Provisional Patent Application 62/383,616 filed on Sep. 6, 2016 and entitled "Random Access to Scenes of a TV Program", which is incorporated herein by reference as if fully set forth herein.

FIELD AND BACKGROUND OF THE INVENTION

The invention, in some embodiments, relates to displaying of one or more video content items, and more particularly to methods and systems that enable a user watching a video content item flexible access to scenes within the video content item, whether the scenes are previous scenes already displayed or following scenes which have not yet been displayed.

It is common for users watching a video content item on the screen of a viewing device, such as a screen of a television, computer, tablet, smartphone, and the like, to want to watch a specific portion of the video content item that has previously been broadcast. This is particularly an issue in a linear broadcasting system, such as linear broadcasting of a television channel where the user cannot rewind or pause the display.

The solutions that are currently available include using a Video-On-Demand (VOD) service for playing a specific video content item that is available in the TV operator's VOD library, such that the user can control (rewind, pause, and fast forward) the video content item, or using a catch-up service for playing video content that was broadcast in recent hours or days. However, these methods do not allow the user direct and easy access to a specific scene. Additionally, as explained hereinbelow, these solutions are insufficient for many usage scenarios.

There is therefore a need in the art for methods and systems for providing users with more flexibility for accessing portions of a video content item.

SUMMARY OF THE INVENTION

Some embodiments of the invention relate to methods, systems, and devices for providing to a user using a client terminal flexible access to scenes of a video content item provided to the client terminal from a central server.

According to an aspect of a first embodiment of the invention, in a system including a central server and at least one client terminal, wherein the central server provides video content items to each one of the at least one client terminal, there is provided a method for providing to a first user of a first client terminal of the at least one client terminal flexible access to video scenes contained within a first video content item provided by the central server to the first client terminal, the method including:

a. receiving, by the first client terminal, at least a portion of the first video content item from the central server;

b. playing, by the first client terminal, the at least a portion of the first video content item;

c. at the first client terminal and while the first client terminal is playing the at least a portion of the first video content item, receiving from the central server a first scene information collection of the first video content item, wherein the first scene information collection includes scene information about at least a first video scene contained in the first video content item;

d. subsequent to the receiving the first scene information collection, at the first client terminal and while the first client terminal is playing the at least a portion of the first video content item, receiving from the central server a second scene information collection of the first video content item, the second scene information collection including scene information about at least a second video scene contained in the first video content item, the second scene not contained in the first scene information collection;

e. providing, by the first client terminal and before the first client terminal finishes playing the at least a portion of the first video content item, a first user interface enabling the first user of the first client terminal to select a single video scene from multiple video scenes contained in the first video content item, wherein the multiple video scenes which may be selected using the first user interface are based on the second scene information collection;

f. receiving, by the first client terminal, a selection of one video scene contained in the first video content item, the selection provided by the first user using the first user interface; and g. subsequent to and in response to the receiving of the selection, playing the one video scene by the first client terminal.

In some embodiments, first scene information collection includes scene information for each member of a first group of video scenes of the first video content item, and the second scene information collection includes scene information for each member of a second group of video scenes of the first video content item, wherein the first group of video scenes is a proper subgroup of the second group of video scenes.

In some embodiments, when determining the first scene information collection, the central server stores at least one result generated by the determining, and the stored at least one result serves as an input to determining the second scene information collection.

In some embodiments, providing the first user interface includes providing an identification of each of the multiple video scenes, the identification included in the second scene information collection.

In some embodiments, the method is further for providing flexible access for a second user of a second client terminal of the at least one client terminal to video scenes contained within a second video content item provided by the central server to the second client terminal, the method further includes:

h. receiving, by the second client terminal, at least a portion of the second video content item from the central server, the second video content item being different from the first video content item;

i. playing, by the second client terminal and at least partially concurrently with the playing of the at least a portion of the first video content item by the first client terminal, the at least a portion of the second video content item;

j. at the second client terminal and while the second client terminal is playing the at least a portion of the second video content item, receiving from the central server a third scene information collection of the second video content item, wherein the third scene information collection of the second video content item includes scene information about at least a third video scene contained in the second video content item;

k. providing, by the second client terminal and before the second client terminal finishes to play the at least a portion of the second video content item, a second user interface enabling the second user of the second client terminal to select a single video scene from multiple video scenes contained in the second video content item, wherein the multiple video scenes which may be selected using the second user interface are based on the third scene information collection of the second video content item;

l. receiving, by the second client terminal, a selection of another video scene contained in the second video content item, the selection provided by the second user using the second user interface; and m. subsequent to and in response to the receiving the selection of the another video scene, playing the another video scene by the second client terminal.

In some embodiments, the one video scene is not played by the first client terminal between starting the playing of the at least a portion of the first video content item and the receiving of the selection of the one video scene.

In some embodiments, the first client terminal and/or the second client terminal is one of a TV set, a personal computer, a Set-Top Box, a tablet and a smartphone.

In some embodiments, the central server is operated by a TV operator.

In some embodiments, scene information of at least one specific video scene included in the first scene information collection contains a location of the at least one specific video scene within the first video content item. In some embodiments, scene information of at least one specific video scene included in the first scene information collection contains a textual title of the at least one specific video scene. In some embodiments, scene information of at least one specific video scene included in the first scene information collection contains a thumbnail of the at least one specific video scene.

In some embodiments, the first scene information collection of the first video content item is generated by the central server while the first client terminal is playing the at least a portion of the first video content item.

In some embodiments, providing the first user interface by the first client terminal includes providing the first user interface while the at least a portion of the first video content item is paused by the first client terminal.

In some embodiments, playing of the one video scene by the first client terminal includes receiving, by the first client terminal, data of the one video scene from the central server.

In some embodiments, playing of the one video scene by the first client terminal includes retrieving data of the one video scene from a storage module of the first client terminal to which storage module the data of the one video scene was recorded when previously received from the central server.

According to another aspect of the first embodiment of the invention, there is provided a device for providing to a first user flexible access to video scenes contained within a first video content item, the device being in communication with a central server providing the first video content item to the device, the device including:

a. a first processor in communication with the central server providing video content items to the device; and b. a first non-transitory computer readable storage medium for instructions execution by the first processor, the first non-transitory computer readable storage medium having stored:
  i. instructions to receive at least a portion of the first video content item from the central server;
  ii. instructions to play the at least a portion of the first video content item;
  iii. instructions, to be carried out during execution of the instructions to play the at least a portion of the first video content item, to receive from the central server a first scene information collection of the first video content item, wherein the first scene information collection includes scene information about at least a first video scene contained in the first video content item;
  iv. instructions, to be carried out subsequent to execution of the instructions to receive the first scene information collection and during execution of the instructions to play the at least a portion of the first video content item, to receive from the central server a second scene information collection of the first video content item, the second scene information collection including scene information about at least a second video scene contained in the first video content item, the second scene not contained in the first scene information collection;
  v. instructions, to be carried out before completing execution of the instructions to play the at least a portion of the first video content item, to provide a first user interface enabling the first user to select a single video scene from multiple video scenes contained in the first video content item, wherein the multiple video scenes which may be selected using the first user interface are based on the second scene information collection;
  vi. instructions to receive a selection of one video scene contained in the first video content item, the selection provided by the first user using the first user interface; and
  vii. instructions, to be carried out subsequent to and in response to the receiving of the selection, to play the one video scene.

In some embodiments, the device is one of a TV set, a personal computer, a Set-Top Box, a tablet and a smartphone.

In some embodiments, the first scene information collection of the first video content item is generated by the central server during execution of the instructions to play the at least a portion of the first video content item.

According to a further aspect of the first embodiment of the invention, there is provided a system for providing to a first user flexible access to video scenes contained within a first video content item, the system including:

a. a central server; and b. at least a first client terminal usable by the first user, the first client terminal including:
  a. a first processor in communication with the central server; and
  b. a first non-transitory computer readable storage medium for instructions execution by the first processor, the first non-transitory computer readable storage medium having stored:
    i. instructions to receive at least a portion of the first video content item from the central server;
    ii. instructions to play the at least a portion of the first video content item;

iii. instructions, to be carried out during execution of the instructions to play the at least a portion of the first video content item, to receive from the central server a first scene information collection of the first video content item, wherein the first scene information collection includes scene information about at least a first video scene contained in the first video content item;

iv. instructions, to be carried out subsequent to execution of the instructions to receive the first scene information collection and during execution of the instructions to play the at least a portion of the first video content item, to receive from the central server a second scene information collection of the first video content item, the second scene information collection including scene information about at least a second video scene contained in the first video content item, the second scene not contained in the first scene information collection;

v. instructions, to be carried out before completing execution of the instructions to play the at least a portion of the first video content item, to provide a first user interface enabling the first user to select a single video scene from multiple video scenes contained in the first video content item, wherein the multiple video scenes which may be selected using the first user interface are based on the second scene information collection;

vi. instructions to receive a selection of one video scene contained in the first video content item, the selection provided by the first user using the first user interface; and vii. instructions, to be carried out subsequent to and in response to the receiving of the selection, to play the one video scene.

In some embodiments, the system is further for providing to a second user flexible access to video scenes contained within a second video content item, the second video content item being different from the first video content item, the system further including:

c. a second client terminal usable by the second user, the second client terminal including:

i. a second processor in communication with the central server; and ii. second non-transitory computer readable storage medium for instructions execution by the second processor, the second non-transitory computer readable storage medium having stored:

1. instructions to receive at least a portion of the second video content item from the central server;

2. instructions, to be carried out at least partially concurrently with execution of the instructions to play the at least a portion of the first video content item by the first processor, to play the at least a portion of the second video content item;

3. instructions, to be carried out during execution of the instructions to play the at least a portion of the second video content item, to receive from the central server a third scene information collection of the second video content item, wherein the third scene information collection of the second video content item includes scene information about at least a third video scene contained in the second video content item;

4. instructions, to be carried out before completing execution of the instructions to play the at least a portion of the second video content item, to provide a second user interface enabling the second user to select a single video scene from multiple video scenes contained in the second video content item, wherein the multiple video scenes which may be selected using the second user interface are based on the third scene information collection of the second video content item;

5. instructions to receive a selection of another video scene contained in the second video content item, the selection provided by the second user using the second user interface; and 6. instructions, to be carried out subsequent to and in response to the receiving the selection of the another video scene, to play the another video scene.

In some embodiments, the first client terminal and/or the second client terminal is one of a TV set, a personal computer, a Set-Top Box, a tablet and a smartphone.

In some embodiments, the central server generates the first scene information collection of the first video content item during execution of the instructions to play the at least a portion of the first video content item.

In some embodiments of the device and/or of the system, the first scene information collection includes scene information for each member of a first group of video scenes of the first video content item, and the second scene information collection includes scene information for each member of a second group of video scenes of the first video content item, wherein the first group of video scenes is a proper subgroup of the second group of video scenes.

In some embodiments, when determining the first scene information collection, the central server stores at least one result generated by the determining, and the stored at least one result serves as an input to determining the second scene information collection.

In some embodiments of the device and/or of the system, the instructions to provide the first user interface include instructions to provide an identification of each of the multiple video scenes, the identification included in the second scene information collection.

In some embodiments of the device and/or of the system, the one video scene is not played by the first processor between starting execution of the instructions to play the at least a portion of the first video content item and execution of the instructions to receive the selection of the one video scene.

In some embodiments of the device and/or of the system, the central server is operated by a TV operator.

In some embodiments of the device and/or of the system, scene information of at least one specific video scene included in the first scene information collection contains a location of the at least one specific video scene within the first video content item. In some embodiments of the device and/or of the system, scene information of at least one specific video scene included in the first scene information collection contains a textual title of the at least one specific video scene. In some embodiments of the device and/or of the system, scene information of at least one specific video scene included in the first scene information collection contains a thumbnail of the at least one specific video scene.

In some embodiments of the device and/or of the system, the instructions to provide the first user interface include instructions to provide the first user interface while playing the at least a portion of the first video content item is paused.

In some embodiments of the device and/or of the system, the instructions to play the one video scene by the first client terminal include instructions to receive, by the first processor, data of the one video scene from the central server. In some embodiments of the device and/or of the system, the instructions to play the another video scene by the second client terminal include instructions to receive, by the second processor, data of the another video scene from the central server.

In some embodiments of the device and/or of the system, the instructions to play the one video scene include instructions to retrieve data of the one video scene from a storage module in communication with the first processor to which storage module the data of the one video scene was recorded when previously received from the central server. In some embodiments of the device and/or of the system, the instructions to play the another video scene include instructions to retrieve data of the another video scene from a storage module in communication with the second processor to which storage module the data of the another video scene was recorded when previously received from the central server.

According to an aspect of a second embodiment of the invention, in a system including a central server and multiple client terminals, wherein the central server provides video content items to each one of the multiple client terminals, there is provided a method for providing to a first user of a first client terminal of the multiple client terminals flexible access to video scenes contained within a first video content item provided by the central server to the first client terminal, and for providing to a second user of a second client terminal of the multiple client terminals access to video scenes contained within a second video content item provided by the central server to the second client terminal, the method including:

a. receiving, by the first client terminal, at least a portion of the first video content item from the central server;
b. playing, by the first client terminal, the at least a portion of the first video content item;
c. at the first client terminal and while the first client terminal is playing the at least a portion of the first video content item, receiving from the central server a first scene information collection of the first video content item, wherein the first scene information collection includes scene information about at least a first video scene contained in the first video content item;
d. providing, by the first client terminal and before the first client terminal finishes playing the at least a portion of the first video content item, a first user interface enabling the first user of the first client terminal to select a single video scene from multiple video scenes contained in the first video content item, wherein the multiple video scenes which may be selected using the first user interface are based on the first scene information collection;
e. receiving, by the first client terminal, a first selection of one video scene contained in the first video content item, the first selection provided by the first user using the first user interface;
f. subsequent to and in response to the receiving of the first selection, playing the one video scene by the first client terminal.
g. receiving, by the second client terminal, at least a portion of the second video content item from the central server, the second video content item being different from the first video content item;
h. playing, by the second client terminal and at least partially concurrently with the playing of the at least a portion of the first video content item by the first client terminal, the at least a portion of the second video content item;
i. at the second client terminal and while the second client terminal is playing the at least a portion of the second video content item, receiving from the central server a second scene information collection of the second video content item from the central server, wherein the second scene information collection of the second video content item includes scene information about at least a second video scene contained in the second video content item;
j. providing, by the second client terminal and before the second client terminal finishes to play the at least a portion of the second video content item, a second user interface enabling the second user of the second client terminal to select a single video scene from multiple video scenes contained in the second video content item, wherein the multiple video scenes contained in the second video content item which may be selected using the second user interface are based on the second scene information collection of the second video content item;
k. receiving, by the second client terminal, a second selection of another video scene contained in the second video content item, the second selection provided by the second user using the second user interface; and
l. subsequent to and in response to the receiving of the second selection, playing the another video scene by the second client terminal.

In some embodiments, the one video scene is not played by the first client terminal between starting the playing of the at least a portion of the first video content item and the receiving of the selection of the one video scene.

In some embodiments, the first client terminal and/or the second client terminal is one of a TV set, a personal computer, a Set-Top Box, a tablet and a smartphone.

In some embodiments, the central server is operated by a TV operator.

In some embodiments, scene information of at least one specific video scene included in the first scene information collection contains a location of the at least one specific video scene within the first video content item. In some embodiments, scene information of at least one specific video scene included in the first scene information collection contains a textual title of the at least one specific video scene. In some embodiments, scene information of at least one specific video scene included in the first scene information collection contains a thumbnail of the at least one specific video scene.

In some embodiments, the first scene information collection of the first video content item is generated by the central server while the first client terminal is playing the at least a portion of the first video content item.

In some embodiments, the providing the first user interface by the first client terminal includes providing the first user interface while the at least a portion of the first video content item is paused by the first client terminal.

In some embodiments, playing of the one video scene by the first client terminal includes receiving, by the first client terminal, data of the one video scene from the central server.

In some embodiments, playing of the one video scene by the first client terminal includes retrieving data of the one video scene from a storage module of the first client terminal to which storage module the data of the one video scene was recorded when previously received from the central server.

According to another aspect of the second embodiment of the invention, there is provided a system for providing to a first user flexible access to video scenes contained within a first video content item and for providing to a second user flexible access to video scenes contained within a second video content item, the second video content item being different from the first video content item, the system including:

a. a central server;
b. a first client terminal useable by the first user, the first client terminal including:
   i. a first processor in communication with the central server; and
   ii. a first non-transitory computer readable storage medium for instructions execution by the first processor, the first non-transitory computer readable storage medium having stored:
      1. instructions to receive at least a portion of the first video content item from the central server;
      2. instructions to play the at least a portion of the first video content item;
      3. instructions, to be carried out during execution of the instructions to play the at least a portion of the first video content item, to receive from the central server a first scene information collection of the first video content item, wherein the first scene information collection includes scene information about at least a first video scene contained in the first video content item;
      4. instructions, to be carried out prior to completion of the execution of the instructions to play the at least a portion of the first video content item, to provide a first user interface enabling the first user to select a single video scene from multiple video scenes contained in the first video content item, wherein the multiple video scenes which may be selected using the first user interface are based on the first scene information collection;
      5. instruction to receive a first selection of one video scene contained in the first video content item, the first selection provided by the first user using the first user interface; and
      6. Instructions, to be carried out subsequent to and in response to the receiving of the first selection, to play the one video scene; and
c. a second client terminal useable by the second user, the second client terminal including:
   i. a second processor in communication with the central server; and
   ii. a second non-transitory computer readable storage medium for instructions execution by the second processor, the second non-transitory computer readable storage medium having stored:
      1. instructions to receive at least a portion of the second video content item from the central server;
      2. instructions, to be carried out at least partially concurrently with execution of the instructions to play the at least a portion of the first video content item by the first processor, to play the at least a portion of the second video content item;
      3. instructions, to be carried out during execution of the instructions to play the at least a portion of the second video content item, to receive from the central server a second scene information collection of the second video content item, wherein the second scene information collection of the second video content item includes scene information about at least a second video scene contained in the second video content item;
      4. instructions, to be carried out prior to completion of execution of the instructions to play the at least a portion of the second video content item, to provide a second user interface enabling the second user to select a single video scene from multiple video scenes contained in the second video content item, wherein the multiple video scenes contained in the second video content item which may be selected using the second user interface are based on the second scene information collection;
      5. instruction to receive a second selection of another video scene contained in the second video content item, the second selection provided by the second user using the second user interface; and
      6. instructions, to be carried out subsequent to and in response to the receiving of the second selection, to play the another video scene.

In some embodiments, the one video scene is not played by the first client terminal between starting execution of the instructions to play the at least a portion of the first video content item and execution of the instructions to receive the first selection of the one video scene.

In some embodiments, the first client terminal and/or the second client terminal is one of a TV set, a personal computer, a Set-Top Box, a tablet and a smartphone.

In some embodiments, the central server is operated by a TV operator.

In some embodiments, scene information of at least one specific video scene included in the first scene information collection contains a location of the at least one specific video scene within the first video content item. In some embodiments, scene information of at least one specific video scene included in the first scene information collection contains a textual title of the at least one specific video scene. In some embodiments, scene information of at least one specific video scene included in the first scene information collection contains a thumbnail of the at least one specific video scene.

In some embodiments, the central server generates the first scene information collection of the first video content item during execution of the instructions to play the at least a portion of the first video content item.

In some embodiments, the instructions to provide the first user interface include instructions to provide the first user interface while playing the at least a portion of the first video content item is paused.

In some embodiments, the instructions to play the one video scene by the first client terminal include instructions to receive, by the first processor, data of the one video scene from the central server. In some embodiments, the instructions to play the another video scene by the second client terminal include instructions to receive, by the second processor, data of the another video scene from the central server.

In some embodiments, the instructions to play the one video scene include instructions to retrieve data of the one video scene from a storage module in communication with the first processor to which storage module the data of the one video scene was recorded when previously received from the central server. In some embodiments, the instructions to play the another video scene include instructions to retrieve data of the another video scene from a storage module in communication with the second processor to which storage module the data of the another video scene was recorded when previously received from the central server.

According to an aspect of a third embodiment of the invention, in a system including a central server and at least one client terminal, wherein the central server provides video content items to each one of the at least one client terminal, there is provided a method for providing to a user of a first client terminal of the at least one client terminal flexible access to video scenes contained within video content items provided by the central server to the first client terminal, the method including:

a. receiving, by the first client terminal, at least a portion of a first video content item from the central server;

b. playing, by the first client terminal, the at least a portion of the first video content item;

c. switching, by the first client terminal from playing the first video content item to playing a second video content item;

d. at the first client terminal, receiving from the central server a scene information collection of the second video content item, wherein the scene information collection of the second video content item includes scene information about at least a first video scene contained in the second video content item;

e. providing, by the first client terminal and before the first client terminal finishes to play the second video content item, a user interface enabling the user of the first client terminal to select a single video scene from multiple video scenes contained in the second video content item, wherein the providing is subsequent to the receiving the scene information collection and wherein the multiple video scenes which may be selected using the user interface are based on the scene information collection;

f. receiving, by the first client terminal, a selection of one video scene contained in the second video content item, wherein the one video scene contained in the second video content item was not played by the first client terminal following the switching, the selection provided by the user using the user interface; and g. subsequent to and in response to the receiving of the selection, playing the one video scene by the first client terminal.

In some embodiments, switching from playing the first video content item to playing the second video content item includes switching from playing a first TV channel to playing a second TV channel. In some embodiments, switching from playing the first video content item to playing the second video content item includes switching from playing a TV channel to playing a VOD video content item. In some embodiments, switching from playing the first video content item to playing the second video content item includes switching from playing a VOD video content item to playing a TV channel. In some embodiments, switching from playing the first video content item to playing the second video content item includes switching from playing a first VOD video content item to playing a second VOD video content item.

In some embodiments, the first client terminal is one of a TV set, a personal computer, a Set-Top Box, a tablet and a smartphone.

In some embodiments, the central server is operated by a TV operator.

In some embodiments, scene information of at least one specific video scene included in the scene information collection contains a location of the at least one specific video scene within the second video content item. In some embodiments, scene information of at least one specific video scene included in the scene information collection contains a textual title of the at least one specific video scene. In some embodiments, scene information of at least one specific video scene included in the scene information collection contains a thumbnail of the at least one specific video scene.

In some embodiments, the scene information collection of the second video content item is generated by the central server while the first client terminal is playing the second video content item.

In some embodiments, providing the user interface by the first client terminal includes providing the user interface while the second video content item is paused by the first client terminal.

In some embodiment, playing of the one video scene by the first client terminal includes receiving, by the first client terminal, data of the one video scene from the central server.

In some embodiments, playing of the one video scene by the first client terminal includes retrieving data of the one video scene from a storage module of the first client terminal to which storage module the data of the one video scene was recorded when previously received from the central server.

According to another aspect of the third embodiment of the invention, there is provided a device for providing to a user flexible access to video scenes contained within video content items, the device being in communication with a central server providing the video content items to the device, the device including:

a. a processor in communication with the central server; and b. a non-transitory computer readable storage medium for instructions execution by the processor, the non-transitory computer readable storage medium having stored:

i. instructions to receive at least a portion of a first video content item from the central server;

ii. instructions to play the at least a portion of the first video content item;

iii. instructions to switch from playing the first video content item to playing a second video content item;

iv. instructions to receive from the central server a scene information collection of the second video content item, wherein the scene information collection of the second video content item includes scene information about at least a first video scene contained in the second video content item;

v. instructions, to be carried out subsequent to execution of the instructions to receive the scene information collection and during playing of the second video content item, to provide a user interface enabling the user to select a single video scene from multiple video scenes contained in the second video content item, wherein the multiple video scenes which may be selected using the user interface are based on the scene information collection;

vi. instructions to receive a selection of one video scene contained in the second video content item, wherein the one video scene contained in the second video content item was not played following execution of the instructions to switch, the selection provided by the user using the user interface; and vii. instructions, to be carried out subsequent to and in response to receiving of the selection, to play the one video scene.

In some embodiments, the device is one of a TV set, a personal computer, a Set-Top Box, a tablet and a smartphone.

According to a further aspect of the third embodiment of the invention, there is provided a system for providing to a user flexible access to video scenes contained within video content items, the system including:
   a. a central server; and
   b. at least a first client terminal usable by the user, the first client terminal including:
      i. a processor in communication with the central server; and
      ii. a non-transitory computer readable storage medium for instructions execution by the processor, the non-transitory computer readable storage medium having stored:
         1. instructions to receive at least a portion of a first video content item from the central server;
         2. instructions to play the at least a portion of the first video content item;
         3. instructions to switch from playing the first video content item to playing a second video content item;
         4. instructions to receive from the central server a scene information collection of the second video content item, wherein the scene information collection of the second video content item includes scene information about at least a first video scene contained in the second video content item;
         5. instructions, to be carried out subsequent to execution of the instructions to receive the scene information collection and during playing of the second video content item, to provide a user interface enabling the user to select a single video scene from multiple video scenes contained in the second video content item, wherein the multiple video scenes which may be selected using the user interface are based on the scene information collection;
         6. instructions to receive a selection of one video scene contained in the second video content item, wherein the one video scene contained in the second video content item was not played following execution of the instructions to switch, the selection provided by the user using the user interface; and
         7. instructions, to be carried out subsequent to and in response to receiving of the selection, to play the one video scene.

In some embodiments, the first client terminal is one of a TV set, a personal computer, a Set-Top Box, a tablet and a smartphone.

In some embodiments, the central server generates the scene information collection of the second video content item during playing of the second video content item.

In some embodiments of the device and/or of the system, the instructions to switch include instructions to switch from playing a first TV channel to playing a second TV channel. In some embodiments of the device and/or of the system, the instructions to switch include instructions to switch from playing a TV channel to playing a VOD video content item. In some embodiments of the device and/or of the system, the instructions to switch include instructions to switch from playing a VOD video content item to playing a TV channel. In some embodiments of the device and/or of the system, the instructions to switch include instructions to switch from playing a first VOD video content item to playing a second VOD video content item.

In some embodiments of the device and/or of the system, the central server is operated by a TV operator.

In some embodiments of the device and/or of the system, scene information of at least one specific video scene included in the scene information collection contains a location of the at least one specific video scene within the second video content item. In some embodiments of the device and/or of the system, scene information of at least one specific video scene included in the scene information collection contains a textual title of the at least one specific video scene. In some embodiments of the device and/or of the system, scene information of at least one specific video scene included in the scene information collection contains a thumbnail of the at least one specific video scene.

In some embodiments of the device and/or of the system, the instructions to provide the user interface include instructions to provide the user interface while playing the second video content item is paused.

In some embodiments of the device and/or of the system, the instructions to play the one video scene includes instructions to receive data of the one video scene from the central server.

In some embodiments of the device and/or of the system, the instructions to play the one video scene include instructions to retrieve data of the one video scene from a storage module in communication with the processor to which storage module the data of the one video scene was recorded when previously received from the central server.

According to an aspect of a fourth embodiment of the invention, in a system including a central server and at least one client terminal, wherein the central server provides video content items to each one of the at least one client terminal, there is provided a method for providing to a user of a first client terminal of the at least one client terminal flexible access to video scenes contained within video content items provided by the central server to the first client terminal, the method including:
   a. receiving, by the first client terminal, at least a portion of a first video content item from the central server;
   b. playing, by the first client terminal, the at least a portion of the first video content item;
   c. switching, by the first client terminal from playing the first video content item to playing a second video content item;
   d. subsequent to the switching, requesting, by the first client terminal and from the central server, scene information of the second video content item;
   e. at the first client terminal and in response to the requesting, receiving from the central server a scene information collection of the second video content item, wherein the scene information collection of the second video content item includes scene information about at least a first video scene contained in the second video content item;
   f. providing, by the first client terminal and before the first client terminal finishes to play the second video content item, a user interface enabling the user of the first client terminal to select a single video scene from multiple video scenes contained in the second video content item, wherein the providing is subsequent to the receiving the scene information collection and wherein the multiple video scenes which may be selected using the user interface are based on the scene information collection;

g. receiving, by the first client terminal, a selection of one video scene contained in the second video content item, the selection provided by the user using the user interface; and h. subsequent to and in response to the receiving of the selection, playing the one video scene by the first client terminal.

In some embodiments, switching from playing the first video content item to playing the second video content item includes switching from playing a first TV channel to playing a second TV channel. In some embodiments, switching from playing the first video content item to playing the second video content item includes switching from playing a TV channel to playing a VOD video content item. In some embodiments, switching from playing the first video content item to playing the second video content item includes switching from playing a VOD video content item to playing a TV channel. In some embodiments, switching from playing the first video content item to playing the second video content item includes switching from playing a first VOD video content item to playing a second VOD video content item.

In some embodiments, requesting of the scene information of the second video content item is carried out in response to the switching.

In some embodiments, the first client terminal is one of a TV set, a personal computer, a Set-Top Box, a tablet and a smartphone.

In some embodiments, the central server is operated by a TV operator.

In some embodiments, scene information of at least one specific video scene included in the scene information collection contains a location of the at least one specific video scene within the second video content item. In some embodiments, scene information of at least one specific video scene included in the scene information collection contains a textual title of the at least one specific video scene. In some embodiments, scene information of at least one specific video scene included in the scene information collection contains a thumbnail of the at least one specific video scene.

In some embodiments, the scene information collection of the second video content item is generated by the central server while the first client terminal is playing the second video content item.

In some embodiments, providing the user interface by the first client terminal includes providing the user interface while the second video content item is paused by the first client terminal.

In some embodiments, playing of the one video scene by the first client terminal includes receiving, by the first client terminal, data of the one video scene from the central server.

In some embodiments, playing of the one video scene by the first client terminal includes retrieving data of the one video scene from a storage module of the first client terminal to which storage module the data of the one video scene was recorded when previously received from the central server.

According to another aspect of the fourth embodiment of the invention, there is provided a device for providing to a user flexible access to video scenes contained within video content items, the device being in communication with a central server providing the video content items to the device, the device including:

a. a processor in communication with the central server; and b. a non-transitory computer readable storage medium for instructions execution by the processor, the non-transitory computer readable storage medium having stored:

i. instructions to receive at least a portion of a first video content item from the central server;

ii. instructions to play the at least a portion of the first video content item;

iii. instructions to switch from playing the first video content item to playing a second video content item;

iv. instructions, to be carried out subsequent to execution of the instructions to switch, to request from the central server scene information of the second video content item;

v. instructions, to be carried out in response to execution of the instructions to request, to receive from the central server a scene information collection of the second video content item, wherein the scene information collection of the second video content item includes scene information about at least a first video scene contained in the second video content item;

vi. instructions, to be carried out subsequent to execution of the instructions to receive the scene information collection and during playing of the second video content item, to provide a user interface enabling the user to select a single video scene from multiple video scenes contained in the second video content item, wherein the multiple video scenes which may be selected using the user interface are based on the scene information collection;

vii. instructions to receive a selection of one video scene contained in the second video content item, the selection provided by the user using the user interface; and viii. instructions, to be carried out subsequent to and in response to receiving of the selection, to play the one video scene.

In some embodiments, the device is one of a TV set, a personal computer, a Set-Top Box, a tablet and a smartphone.

According to a further aspect of the fourth embodiment of the invention, there is provided a system for providing to a user flexible access to video scenes contained within video content items, the system including:

a. a central server; and b. at least a first client terminal usable by the user, the first client terminal including:

i. a processor in communication with the central server; and ii. a non-transitory computer readable storage medium for instructions execution by the processor, the non-transitory computer readable storage medium having stored:

1. instructions to receive at least a portion of a first video content item from the central server;

2. instructions to play the at least a portion of the first video content item;

3. instructions to switch from playing the first video content item to playing a second video content item;

4. instructions, to be carried out subsequent to execution of the instructions to switch, to request from the central server scene information of the second video content item;

5. instructions, to be carried out in response to execution of the instructions to request, to receive from the central server a scene information collection of the second video content item, wherein the scene information collection of the second video content item includes scene information about at least a first video scene contained in the second video content item;

6. instructions, to be carried out subsequent to execution of the instructions to receive the scene information collection and during playing of the second video content item, to provide a user interface enabling the user to select a single video scene from multiple video scenes contained in the second video content item, wherein the multiple video scenes which may be selected using the user interface are based on the scene information collection;

7. instructions to receive a selection of one video scene contained in the second video content item, the selection provided by the user using the user interface; and 8. instructions, to be carried out subsequent to and in response to receiving of the selection, to play the one video scene.

In some embodiments, the first client terminal is one of a TV set, a personal computer, a Set-Top Box, a tablet and a smartphone.

In some embodiments, the central server generates the scene information collection of the second video content item during playing of the second video content item.

In some embodiments of the device and/or of the system, the instructions to switch include instructions to switch from playing a first TV channel to playing a second TV channel. In some embodiments of the device and/or of the system, the instructions to switch include instructions to switch from playing a TV channel to playing a VOD video content item. In some embodiments of the device and/or of the system, the instructions to switch include instructions to switch from playing a VOD video content item to playing a TV channel. In some embodiments of the device and/or of the system, the instructions to switch include instructions to switch from playing a first VOD video content item to playing a second VOD video content item.

In some embodiments of the device and/or of the system, the instructions to request the scene information of the second video content item is carried out in response to execution of the instructions to switch.

In some embodiments of the device and/or of the system, the central server is operated by a TV operator.

In some embodiments of the device and/or of the system, scene information of at least one specific video scene included in the scene information collection contains a location of the at least one specific video scene within the second video content item. In some embodiments of the device and/or of the system, scene information of at least one specific video scene included in the scene information collection contains a textual title of the at least one specific video scene. In some embodiments of the device and/or of the system, scene information of at least one specific video scene included in the scene information collection contains a thumbnail of the at least one specific video scene.

In some embodiments of the device and/or of the system, the instructions to provide the user interface include instructions to provide the user interface while playing the second video content item is paused.

In some embodiments of the device and/or of the system, the instructions to play the one video scene include instructions to receive data of the one video scene from the central server.

In some embodiments of the device and/or of the system, the instructions to play the one video scene include instructions to retrieve data of the one video scene from a storage module in communication with the processor to which storage module the data of the one video scene was recorded when previously received from the central server.

According to an aspect of a fifth embodiment of the invention, in a system including a central server and at least one client terminal, wherein the central server provides video content items to each one of the at least one client terminal, there is provided a method for providing to a user of a first client terminal of the at least one client terminal flexible access to video scenes contained within video content items provided by the central server to the first client terminal, the method including:

a. receiving, by the first client terminal, at least a portion of a first video content item from the central server;

b. playing, by the first client terminal, the at least a portion of the first video content item;

c. at the first client terminal and while the first client terminal is playing the at least a portion of the first video content item, receiving from the central server a scene information collection of a second video content item, wherein the scene information collection of the second video content item includes scene information about at least a first video scene contained in the second video content item;

d. switching, by the first client terminal and subsequent to the receiving the scene information collection, from playing the first video content item to playing the second video content item;

e. providing, by the first client terminal and before the first client terminal finishes to play the second video content item, a user interface enabling the user of the first client terminal to select a single video scene from multiple video scenes contained in the second video content item, wherein the providing is subsequent to the switching and prior to receiving by the first client terminal of any additional scene information collection of the second video content item, and wherein the multiple video scenes which may be selected using the user interface are based on the scene information collection;

f. receiving, by the first client terminal, a selection of one video scene contained in the second video content item, the selection provided by the user using the user interface; and g. subsequent to and in response to the receiving of the selection, playing the one video scene by the first client terminal.

In some embodiments, the method further includes, following the receiving the scene information collection and prior to the switching, storing at the first client terminal at least a portion of the scene information collection of the second video content item, wherein the providing of the user interface is based on the stored at least a portion of the scene information collection.

In some embodiments, switching from playing the first video content item to playing the second video content item includes switching from playing a first TV channel to playing a second TV channel. In some embodiments, switching from playing the first video content item to playing the second video content item includes switching from playing a TV channel to playing a VOD video content item. In some embodiments, switching from playing the first video content item to playing the second video content item includes switching from playing a VOD video content item to playing a TV channel. In some embodiments, switching from playing the first video content item to playing the second video content item includes switching from playing a first VOD video content item to playing a second VOD video content item.

In some embodiments, the first client terminal is one of a TV set, a personal computer, a Set-Top Box, a tablet and a smartphone.

In some embodiments, the central server is operated by a TV operator.

In some embodiments, scene information of at least one specific video scene included in the scene information collection contains a location of the at least one specific video scene within the second video content item. In some embodiments, scene information of at least one specific video scene included in the scene information collection contains a textual title of the at least one specific video scene. In some embodiments, scene information of at least one specific video scene included in the scene information collection contains a thumbnail of the at least one specific video scene.

In some embodiments, the scene information collection of the second video content item is generated by the central server while the first client terminal is playing the first video content item.

In some embodiments, providing the user interface by the first client terminal includes providing the user interface while the second video content item is paused by the first client terminal.

In some embodiments, playing of the one video scene by the first client terminal includes receiving, by the first client terminal, data of the one video scene from the central server.

In some embodiments, playing of the one video scene by the first client terminal includes retrieving data of the one video scene from a storage module of the first client terminal to which storage module the data of the one video scene was recorded when previously received from the central server.

According to another aspect of the fifth embodiment of the invention, there is provided a device for providing to a user flexible access to video scenes contained within video content items, the device being in communication with a central server providing the video content items to the device, the device including:
a. a processor in communication with the central server; and
b. a non-transitory computer readable storage medium for instructions execution by the processor, the non-transitory computer readable storage medium having stored:
  i. instructions to receive at least a portion of a first video content item from the central server;
  ii. instructions to play the at least a portion of the first video content item;
  iii. instructions, to be carried out during execution of the instructions to play the at least a portion of the first video content item, to receive from the central server a scene information collection of a second video content item, wherein the scene information collection of the second video content item includes scene information about at least a first video scene contained in the second video content item;
  iv. instructions to switch from playing the first video content item to playing the second video content item;
  v. instructions, to be carried out subsequent to execution of the instructions to switch, during playing of the second video content item, and prior to receiving by the processor any additional scene information collection of the second video content item, to provide a user interface enabling the user to select a single video scene from multiple video scenes contained in the second video content item, wherein the multiple video scenes which may be selected using the user interface are based on the scene information collection;
  vi. instructions to receive a selection of one video scene contained in the second video content item, the selection provided by the user using the user interface; and
  vii. instructions, to be carried out subsequent to and in response to receiving of the selection, to play the one video scene.

In some embodiments, the device is one of a TV set, a personal computer, a Set-Top Box, a tablet and a smartphone.

According to a further aspect of the fifth embodiment of the invention, there is provided a system for providing to a user flexible access to video scenes contained within video content items, the system including:
a. a central server; and
b. at least a first client terminal usable by the user, the first client terminal including:
  i. a processor in communication with the central server; and
  ii. a non-transitory computer readable storage medium for instructions execution by the processor, the non-transitory computer readable storage medium having stored:
    1. instructions to receive at least a portion of a first video content item from the central server;
    2. instructions to play the at least a portion of the first video content item;
    3. instructions, to be carried out during execution of the instructions to play the at least a portion of the first video content item, to receive from the central server a scene information collection of a second video content item, wherein the scene information collection of the second video content item includes scene information about at least a first video scene contained in the second video content item;
    4. instructions to switch from playing the first video content item to playing the second video content item;
    5. instructions, to be carried out subsequent to execution of the instructions to switch, during playing of the second video content item, and prior to receiving by the processor any additional scene information collection of the second video content item, to provide a user interface enabling the user to select a single video scene from multiple video scenes contained in the second video content item, wherein the multiple video scenes which may be selected using the user interface are based on the scene information collection;
    6. instructions to receive a selection of one video scene contained in the second video content item, the selection provided by the user using the user interface; and
    7. instructions, to be carried out subsequent to and in response to receiving of the selection, to play the one video scene.

In some embodiments, the first client terminal is one of a TV set, a personal computer, a Set-Top Box, a tablet and a smartphone.

In some embodiments, the central server generates the scene information collection of the second video content item while the first client terminal is playing the first video content item.

In some embodiments of the device and/or of the system, the non-transitory computer readable storage medium further has stored instructions, to be carried out following execution of the instructions to receive the scene information collection and prior to execution of the instructions to switch, to store at least a portion of the scene information collection of the second video content item, and wherein the instructions to provide the user interface are based on the stored at least a portion of the scene information collection.

In some embodiments of the device and/or of the system, the instructions to switch include instructions to switch from playing a first TV channel to playing a second TV channel. In some embodiments of the device and/or of the system, the instructions to switch include instructions to switch from playing a TV channel to playing a VOD video content item. In some embodiments of the device and/or of the system, the instructions to switch include instructions to switch from playing a VOD video content item to playing a TV channel. In some embodiments of the device and/or of the system, the instructions to switch include instructions to switch from playing a first VOD video content item to playing a second VOD video content item.

In some embodiments of the device and/or of the system, the central server is operated by a TV operator.

In some embodiments of the device and/or of the system, scene information of at least one specific video scene included in the scene information collection contains a location of the at least one specific video scene within the second video content item. In some embodiments of the device and/or of the system, scene information of at least one specific video scene included in the scene information collection contains a textual title of the at least one specific video scene. In some embodiments of the device and/or of the system, scene information of at least one specific video scene included in the scene information collection contains a thumbnail of the at least one specific video scene.

In some embodiments of the device and/or of the system, the instructions to provide the user interface include instructions to provide the user interface while playing the second video content item is paused.

In some embodiments of the device and/or of the system, the instructions to play the one video scene include instructions to receive data of the one video scene from the central server.

In some embodiments of the device and/or of the system, the instructions to play the one video scene include instructions to retrieve data of the one video scene from a storage module in communication with the processor to which storage module the data of the one video scene was recorded when previously received from the central server.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIGS. 1A and 1B are, respectively, a schematic block diagram of an embodiment of a system for providing flexible access to video scenes and a flow chart of a method for providing flexible access to video scenes, according to a first embodiment of the teachings herein;

FIGS. 3A and 3B are, respectively, a schematic block diagram of an embodiment of a system for providing flexible access to video scenes and a flow chart of a method for providing flexible access to video scenes, according to a third embodiment of the teachings herein;

FIGS. 4A and 4B are, respectively, a schematic block diagram of an embodiment of a system for providing flexible access to video scenes and a flow chart of a method for providing flexible access to video scenes, according to a fourth embodiment of the teachings herein;

FIGS. 5A and 5B are, respectively, a schematic block diagram of an embodiment of a system for providing flexible access to video scenes and a flow chart of a method for providing flexible access to video scenes, according to a fifth embodiment of the teachings herein.

DESCRIPTION OF SOME EMBODIMENTS OF THE INVENTION

Figure 1B:
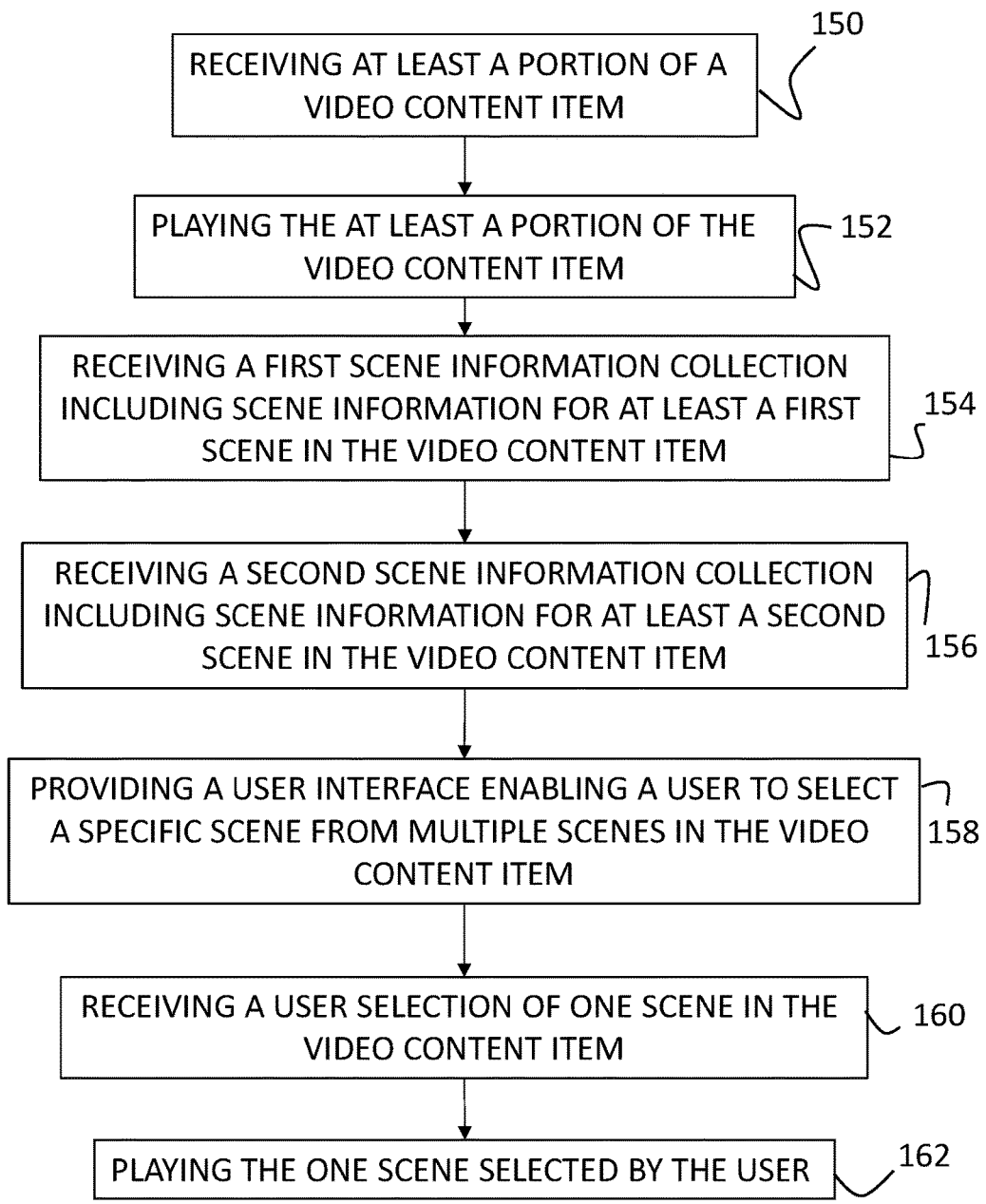

The invention, in some embodiments, relates to displaying of one of more video content items, and more particularly to methods and systems that enable a user watching a video content item flexible access to scenes within the video content item, whether the scenes are previous scenes already displayed or following scenes which have not yet been displayed.

As mentioned hereinabove, VOD and catch-up services provide useful support to users who want to view video content items or scenes thereof at a time other than when the items are being broadcast, but they do not address scenarios in which the user wants to view a specific video scene within a specific video content item that has already been broadcast or is still being broadcast, without having to watch the video content item from its beginning and without having to search for the specific scene iteratively jumping back and forth within the video content item.

For example, VOD and catch-services do not provide sufficient flexibility to the user in the following exemplary scenarios:

1. A user watches a news program which is an hour long, and which contains many news items. When the program ends, the user, who is very interested in archeology, wants to re-watch a news item that was about a new archeological discovery, as he would like to remember more of the details presented in that news item. The user does not remember where exactly within the news program that news item was broadcast.

2. A user watches an action movie. When the movie ends the user wants to re-watch a famous car racing scene which appeared within the movie.

3. A user watches a news program which is an hour long and contains many news items. While in the middle of a news item and a few minutes before the end of the program, the user loses interest in the news items still to be shown and instead wants to re-watch a news item, dealing with a new archeological discovery, which he had previously watched within the same news program.

4. A user starts watching a news program in the middle, for example when he zapped into the news program from another channel in the middle of the news program. The program is an hour long and contains many news items, some of which the user had missed. At some later point in time, either during broadcasting of the program or after the program has ended, the user gets a call from a friend advising him to watch a news item relating to a new archeological discovery, which item was broadcast before he zapped to the news program.

5. A user that is watching an arbitrary television channel receives a phone call from a friend advising him that another channel, that is currently broadcasting a news program, had just shown a very interesting news item about a new archeological discovery that he should watch.

6. A user wants to watch the movie "The Good, the Bad and the Ugly" from the VOD library available from his TV operator. However, he is not interested in watching the full movie, and only wants to watch the famous scene in which the sentence "If you have to shoot, shoot, don't talk" is said. However, the user does not know where exactly in the movie does this famous scene appear.

In all the of the exemplary scenarios above, the user wishes to watch a specific scene, which may be in the middle of a video content item, not during the broadcasting time of that scene. Even if the video content item is available in a VOD or catch-up system, such systems would require the user to search the video content item for the specific scene the user wants to watch, which may be time consuming and cumbersome.

As such, it is a goal of the present invention to enable a user to easily access a specific scene anywhere in a video content item, without having to search for the scene. It is a further goal of the present invention to allow such ease of access while the video content item is being broadcast, as well as before and/or after the video content item is broadcast.

Some portions of the disclosure herein relate to two video content items and/or to two users. However, the disclosed devices, systems, and methods are equally applicable to any number of video content items and/or to any number of users.

In the context of the present application, the terms "video content item" and "program" may be used interchangeably, and relate to a stand-alone unit of video content that can be referred to, and is identified, by a single reference, and can be played independently of other video content. Examples of video content items include, a movie, a news program, a music video clip or an episode of a TV series.

In the context of the present application, the term "playing a video content item" relates to displaying the video content item as a motion picture on a display screen or surface, and excludes times when display of the video content item is paused or stopped.

In the context of the present application, the terms "video shot" and "shot" may be used interchangeably, and relate to a continuous sequence of frames within a video content item that were continuously recorded by the same camera. A video shot is a physical entity that does not deal with the semantic meaning of its content.

In the context of the present application, the terms "video scene" and "scene" may be used interchangeably, and relate to a collection of semantically-related and temporally adjacent video shots depicting and conveying a high-level concept or story. In other words, a video scene is a semantic entity that is a continuous portion of a video content item and has an independent identity. Examples of video scenes may be a specific news item of a news program or a car chase scene of an action movie. Typically there are multiple video scenes within a video content item, but a video content item may also include a single video scene, as may be the case for a short music video clip.

In the context of the present application, the term "scene information" relates to a collection of one or more informational data items associated with a specific video scene. Examples of informational data items, that may be included in the scene information of a video scene, include:

a location of the video scene within the video content item (for example specified by a time elapsed from the beginning of the video content item to the beginning of the video scene, or by identification of another video scene immediately preceding the video scene);

a length of the video scene (for example measured in seconds);

an ending point of the video scene (for example specified by time elapsed from the beginning of the video content item and to the end of the video scene);

a title of the video scene (for example, a text string); and a thumbnail of the video scene (for example an image).

The scene information of a video scene may contain multiple informational data items of the same category, for example multiple titles or multiple thumbnails.

In the context of the present application, the term "scene information collection" relates to a collection containing scene information of one or more video scenes. The informational data items included in the scene information of different video scenes, within a same scene information collection, need not be the same. For example, the scene information for one video scene may include only location, length and title of the scene, while the scene information for another video scene may include only location, ending point and thumbnail. A scene information collection may contain scene information of a single video scene.

For the purpose of the current disclosure a scene information collection is assumed to contain only scene information of video scenes included in a common video content item, while ignoring other information that may be included in the collection, such as scene information of video scenes belonging to other video content items. As such, a scene information collection containing scene information of several video scenes of video content item A as well as scene information of several scenes of video content item B may be considered either as a scene information collection of video content item A (ignoring scene information relating to scenes from video content item B) or as a scene information collection of video content item B (ignoring scene information relating to scenes from video content item A), according to circumstances.

In the context of the present application, the terms "central server" and "server" may be used interchangeably, and relate to a computing device capable of concurrently communicating with multiple client terminals and providing each of them with one or more services. For example, a central server of a TV operator may provide each Set-Top Box (STB) of a plurality of STBs (each located at a home of a different subscriber of the operator) with a video stream corresponding to a TV channel or video content item selected by the subscriber. The central server may include a single processor or multiple processors, and may also comprise peripheral devices of various types.

In the context of the present application, the terms "client terminal" and "terminal" may be used interchangeably, and relate to a computing device supporting a client of a distributed system. For example, a client terminal of a TV distribution system may be a TV set, a personal computer, a Set-Top Box, a tablet or a smartphone, which is capable of receiving a video stream corresponding to a TV video channel or a video content item selected by the corresponding subscriber.

In the context of the present application, the term "linear TV channel" relates to a TV channel that broadcasts video content according to a pre-planned schedule.

In the context of the present application, the term "Video On Demand (VOD)" relates to a service provided by a TV operator that delivers video content items from a library to users according to the users' specific requests. The library may be operated and/or maintained by the TV operator. The video content items are delivered to the users at a time defined by the user, without being bound by a pre-planned schedule.

In the context of the present application, the term "catch-up viewing" relates to a service provided by a TV operator that allows users to watch video content of a linear TV channel which is lagging in time behind the real-time broadcast of the channel. Typical ways of entering catch-up viewing include:

Pausing playing of the channel for a certain time and then resuming playing of the channel after some delay. This is useful, for example, when the user wants to go to the restroom during the playing of a movie.

Searching the program guide for a program that was broadcasted in recent days and selecting a specific program to be played now. This is useful, for example, when the user knows what program he wants to watch and can identify it in the program guide.

Providing a time gap value and instructing the device to move the video content item back in time by that time gap value. This is useful, for example, when the user wants to jump to some desired point in previously played content, and will typically involve multiple iterations ("go back 50 minutes", "go forward 5 minutes", "go back 2 minutes", etc.) in order to arrive exactly at the desired point in the video content item.

In the context of the present application, the term "X is a proper subgroup of Y" relates to two groups X and Y such that every member of group X is also a member of group Y and there is at least one member of group Y that is not a member of group X.

In the context of the present application, the term "playing video content items partially concurrently" relates to playing of at least two video content items, such that there is a temporal overlap in their playing time. In other words, there is a non-zero time interval in which all of the at least two video content items are being played. More specifically, video content items X and Y are played partially concurrently if video content item X is played, and at least a portion of video content item Y started playing together with or after video content X has started playing, and stopped playing together with or before video content item X has stopped playing. For example, if a 50 minute TV show begins playing at 10:00 pm, and at 10:45 a 10 minute video clip begins playing, the TV show and video clip are played partially concurrently.

In the context of the present application, the term "or" is used as an "inclusive or", such that the phrase "A or B" is satisfied by "only A", "only B", or "A and B".

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the examples. The invention can be implemented with other embodiments and can be practiced or carried out in various ways. It is also understood that the phraseology and terminology employed herein is for descriptive purpose and should not be regarded as limiting.

The present invention provides a solution to the limitations described above, based on a division of video content items to video scenes, and providing to the user direct access to a specific such video scene.

For example, a movie may be divided into video scenes at the semantic level of its content. In this case, a video scene is a collection of semantically related and temporally adjacent video shots depicting and conveying a high-level concept or story.

As another example, a news program may be divided into video scenes at the boundaries between individual news items, with each news item being a video scene of its own.

Methods for automatically dividing video content into video scenes are known in the art. Most algorithms for achieving such division into video scenes are based on a bottom-up analysis that begins with individual video frames. For example, a typical algorithm may, at a first stage, analyze video frames in order to identify boundaries of video shots based on pixels and colors similarities and differences between successive frames. At the next stage, the video shots are analyzed in order to find out how they combine into video scenes based on time-span considerations and similarities or differences between shots.

When entering the semantic level of scenes, additional input is typically used to improve the quality of the division into scenes. For example, the audio track of the video content item may be analyzed to identify speakers, thus confirming or rejecting current hypotheses about grouping shots into scenes. Similarly, text of closed caption titles and/or face detection technologies may be used to confirm or reject a grouping of shots.

Examples of prior art algorithms for automatically dividing video content into video scenes include:

http://research.microsoft.com/en-us/um/people/yongrui/ps/mms98.pdf https://arxiv.org/ftp/arxiv/papers/1412/1412.4470.pdf http://mcl.usc.edu/wp-content/uploads/2014/01/200408-Content-based-movie-analysis-and-indexing-based-on-audiovisual-cues.pdf All of the above prior art documents are incorporated herein by reference in their entirety.

In addition to dividing a video content item into video scenes, a scene-dividing algorithm may also select an image to serve as a thumbnail for each video scene. The thumbnail may be selected so as to represent content of the corresponding scene and may be used by a user to identify the scene, similarly to the use of a thumbnail corresponding to a video file in a computer directory listing. The thumbnail may be one of the frames of the video scene or may be an image that is not a frame of the video scene but is related to its content (for example a picture of an actor appearing in the scene). The thumbnail may be selected according to a straightforward rule—for example the first frame of a scene or the last frame of a scene. Alternatively, complex algorithms may be used for selecting a representative image for a scene, similar to algorithms known in the prior art for selecting a thumbnail for a video file. Such algorithms may take into account metadata of the video content item (e.g. shooting location, plot location, actor names, genre, etc.) as well as a visual analysis of frames of the video scene, aural analysis of a sound track of the video scene, or textual analysis of closed captions of the video scene. Methods for automatically generating thumbnails for video content are disclosed in US Application Publication No. 2014/0099034, which is incorporated herein by reference in its entirety.

Optionally, the scene-dividing algorithm may also generate a textual title for each video scene. Like the thumbnail, the title is selected to represent the content of the corresponding scene.

According to the present invention, a list of scenes may be provided to the user, enabling the user to easily find a specific scene within a video content item, and in some cases, to easily re-watch an already displayed video scene.

With respect to the exemplary scenarios brought above, in scenario 1 the user wishes to watch a specific news item relating to archeology, which news item has already been played as part of a news program. When the news program ends, the user's screen automatically shows a list of the video scenes of the program (which may typically be the list of news items in the program), each identified in the list by a thumbnail, by a textual title or by both. Alternatively, the list may be shown to the user after an explicit request is made by the user, for example by pressing a button.

The list of video scenes enables the user to look for the archeological news item he wants to watch by identifying it according to its thumbnail and/or its title. When the user selects the archeological news item from the list, playing of content begins from the beginning of that news item. Playing may automatically end at the end of the selected news item, or alternatively may continue until the end of the news program containing the selected news item.

Scenario 2 described hereinabove is similar to scenario 1, except that the video content item is a movie rather than a news program. As such, the determination of the video scenes may be more complex, and may require the full power of an automatic scene-dividing algorithm. However, from both the user's point of view and the process flow point of view, a scene list may be provided exactly as suggested with respect to scenario 1. Furthermore, the method for providing such a scene list and for receiving from the user an indication of a selected scene is the same in these two scenarios.

In all the exemplary scenarios, the information required for displaying the list of video scenes, such as thumbnails, titles, locations of video scenes within the video content item and the like, is obtained from the operator providing the video content item. As such, analysis of the video content item, for example for division of the video content item into video scenes and for determination of scene information for these video scenes, is carried out by the operator's server, as is distribution of the resulting scene information to users watching that video content item and optionally also to users not currently watching the video content item, as will be explained below for other scenarios.

If the video content item is taken from the operator's library (e.g. a movie, an episode of a TV series) the data may be provided from the operator to the user's device ahead of time, for example when providing the program guide (EPG) to the user's device, when initiating playing of the video content item, or during playing of the video content item. If, however, the video content item is streamed or is broadcast in parallel to being generated (e.g. live news broadcast), the data can only be obtained from the operator during playing of the video content item or when the video content item ends.

In all of the exemplary scenarios, playing of the selected video scene may be locally handled at the user's client terminal, in which case the location of the selected video scene within the video content item is used to access a local copy of the video content item and to play the video content item from the designated location. The local copy may be locally stored by the client terminal when the video content item is first provided by the operator's server for the original viewing by the user.

Alternatively, the video content item may be streamed to the user's client terminal without being locally stored, in which case playing of the selected video scene is achieved by the client terminal providing to the operator's server an identification of the selected scene, and receiving content of the selected scene from the server for presenting it to the user in response to the selection.

In some of the exemplary scenarios, such as scenario 3, the user does not reach the end of the video content item, and wants to jump to a specific scene while the video content item is still playing. In order to support such a use case, the user must be able to request a list of video scenes at any point in time during the playing of the video content item, for example by pressing a button. The list of scenes is presented in response to such a request. In cases in which the future part of the program is not yet available, such as in a live news program, the list includes only the video scenes (news items) already broadcast. In cases in which the entirety of the video content item is available in advance, such as when the video content item is obtained from a library, the list of scenes may be a shortened list including only scenes already played, or a full list including scenes already played as well as scenes not yet played, thus enabling the user to "jump forward" to a yet unwatched video scene.

In some cases, such as in scenario 3 with real-time streamed content, the operator's server may continuously analyze the broadcast video content item, during broadcasting thereof, and may periodically provide updated scene lists to all client terminals currently playing the video content item, thus enabling the client terminal to display the most updated scene list immediately after the list is requested by the user. Otherwise, an updated list must be obtained upon receipt of the user's request for the list, which may cause a disturbing delay between the user's request and display of the list of scenes, as the client terminal must request the list of scenes from the server and wait for a response from the server before the list of scenes may be displayed to the user. An embodiment of a system and method suitable for such scenarios is described hereinbelow with respect to FIGS. 1A and 1B.

The time between successive updates to the list of scenes may be affected by a number of client terminals being periodically updated with scene lists, bandwidth available for such updates, and a size of the update message, as well as by other factors affecting the loading of the network by the updates. In some embodiments, the shortest update duration is no longer than a length of the shortest scene in the currently playing video content item. If the shortest update duration is longer than the length of the shortest scene, there is an increased probability that a client terminal might display a scene list that not only lacks the currently playing scene and possibly the scene immediately preceding the currently playing scene, but also lacks a third scene immediately preceding the scene before the current scene. This may occur when the latest update available to the client terminal at the time of request for the scene list was received prior to that third scene being recognized by the server. Preferably, the time between successive updates of the scene list should be no longer than half the length of the shortest scene of the current program. Typical values for the time between successive updates are 10 seconds to 5 minutes.

It is appreciated that when the server compiles an updated scene list of a currently playing program, the video scene currently playing may not yet be recognized. The server may decide to include an entry for the current scene in the update or it may omit it. If such an entry is included, a receiving client terminal may ignore this entry or may display the entry for the currently playing scene as part of the scene list. Selection of the entry for the currently playing scene may cause the scene to restart playing from its beginning.

In scenario 4 described hereinabove, the user wants to watch a previously broadcast news item. However, in this example, the user did not watch that item when it was first broadcast because he joined the current channel at a later point in time. In order to enable the user to select the desired scene in the current video content item, once the user zapped to the current channel from a previously watched channel, the operator's server immediately sends to the user's client terminal the most updated scene information required for presenting a list of the video scenes in the currently played program. This most updated scene information includes information for all scenes of the program already played, beginning from the first video scene of the program to the scene played at the time that the user switched to watching the program and may, in some embodiments, also include information for scenes not yet played, if such scene information is available to the operator. The server may then continue to provide scene information updates as they become available. Thus when at a later point in time the user asks for a list of scenes of the current program, the local client terminal already has updated data for presenting such a list to the user, allowing the user to select the desired scene even if it was not previously played by his client terminal. An embodiment of a system and method suitable for such scenarios is described hereinbelow with respect to FIGS. 3A and 3B.

Scenario 5 described hereinabove is similar to scenario 4. In this scenario, the user requests the list of scenes of a channel immediately after switching into that channel. Specifically, if the user decides to follow his friend's recommendation to watch the archeological news item, he switches to the channel broadcasting the news program and immediately asks for the list of video scenes for that program. However, as the operator's server could not predict the user will switch to that specific channel at that specific time, the user's client terminal does not yet have the information required for providing such a list of video scenes for the new channel. In this case, the client terminal may actively request the information from the server upon request of the scene list by the user in order to cause a faster update from the server, though the display of the scene list may still be delayed more than is desired. An embodiment of a system and method suitable for such scenarios is described hereinbelow with respect to FIGS. 4A and 4B.

The delay in receipt of the scene information for creating the scene list may be alleviated by the operator's server continuously maintaining updated scene information for all the channels it provides to its subscribers, regardless of whether or not that specific channel is currently being watched. Each client terminal is continuously updated with the list applicable for the program currently watched by its user. When a user switches to a new channel, the server immediately sends the most updated list of scenes currently available for that new channel to the client terminal of that user, making it available for display to the user. As the server always has a most recent scenes list for all channels, sending of the list to a client terminal of a user who had just zapped to a new channel can occur immediately upon zapping.

If the server would not have continuously processed all channels and the user would have switched to a channel that is currently not processed, the user might face a noticeable delay before the list of scenes of the new channel is displayed. This is due to the fact that the server must first run an analysis of the current program to identify scenes and scene information, before being able to provide such scene information to the client terminal for displaying the list, and such analysis might be time-consuming, depending on the time elapsed since program start.

In an alternative embodiment, described hereinbelow with respect to FIGS. 5A and 5B, the delay in providing the video scenes list of the new channel may be eliminated entirely, at the expense of extra network communication and extra local storage in client terminals. As in the previous solution, the operator's server continuously maintains updated scene information for all the channels it provides to its subscribers, regardless of whether or not that specific channel is currently being watched. Each client terminal is continuously updated with the scene list applicable for the program currently watched by its user as well as with updated scene lists of at least some channels that are not currently being watched by that client terminal. The channels for which updates are sent even when the channels are not being watched may be all the channels available from the operator, all the channels currently being watched by at least some predefined number of client terminals, all the channels in a predefined list of popular channels, etc. In some embodiments, each client terminal may have a customized list of favorite channels, for which updates of scene lists are always provided, regardless of whether or not those favorite channels are being watched by that terminal.

A client terminal receiving a scene list update for a channel not currently being watched may either ignore the update or store it in a local storage for later use, applying any suitable decision rule for deciding between storing and ignoring. For example, a client terminal may store updates for channels which are considered favorites of the local user and ignore updates for all other channels, or it may store updates for channels which were watched by the local user during the last 24 hours and ignore updates for all other channels. When a user zaps to a new channel and the new channel is a channel for which the client terminal had stored the scene list updates, the client terminal does not have to wait for a scene list update to be received from the server and is immediately ready to display the list of scenes to the user. In this case there is no delay between the user switching to a new program and the client terminal displaying the scene list for the new program.

If the local client terminal does not have a previously stored scene list for the new channel to which the user switched, either because an update for this channel was not provided by the server or because the local client terminal decided to ignore updates for this channel when such updates were previously received, the situation is equivalent to that described in the previous solution, where the update is stored at the server and can be transmitted to the client terminal immediately upon the user switching channels, such that the delay incurred is that of the time it takes to transmit the update to the client terminal, and in the case of the terminal ignoring previous updates for the new channel also the time it takes to notify the server that an immediate update is required.

In the sixth scenario described hereinabove, the user wants to randomly access a scene of a program that is obtained from the VOD library of an operator. As the video content item is available to the operator in advance of the request, the server may generate a list of the video scenes once, and may store the generated list in the library together with the video content item. When a user requests to watch the video item, scene information is delivered to the user's client terminal, either ahead of starting playing the item or in parallel thereto. As such, the list of scenes is immediately available upon receipt of a request from the user to display the list of scenes.

Periodic updating of a list of scenes of a program provides a better response time than repeatedly carrying out a fresh analysis of that program. This is clear when relating to prior art algorithms used for automatically processing a video content item to generate a scene list thereof. When repeatedly processing a program while it is being broadcast, each processing cycle results in a list of scenes for all scenes from the first scene broadcast to the currently broadcast scene or close thereto. The next update to the list of scenes includes all the scenes already listed, as well as additional scenes played in the time interval from processing of the current scene list to processing of the next update. As such, the two computations of the scene lists may be related, and can be implemented more efficiently by having each computation cycle use the results of the previous computation cycle to reduce the load on the system and the required computation time.

As described hereinabove, most scene division algorithms utilize a division of the video content item into shots, and then group shots into scenes. Since video shots are physical entities that do not depend on the surrounding portion, the division of a portion of the program into shots does not change when that portion is included as a subset in a bigger portion. As such, in each processing cycle, one need only divide into video shots the section of the video content item played in the time interval since the previous processing cycle, or previous update, and append the resulting list of additional shots to the previously generated and stored list of shots, thereby reducing much of the processing required. Thus, for each processing cycle of updating the scene list, the tedious task of dividing the entire portion of the video content item played thus far into video shots is reduced to dividing into shots only the portion of the video content item played in the relatively small time interval between the previous and current updates and to retrieving the rest of the shots from the stored results of the previous update.

Additionally, iterative processing may save much of the extensive computation and processing required to combine the shots into scenes. Using as an example the algorithm described in http://research.microsoft.com/en-us/um/people/yongrui/ps/mms98.pdf (referred to herein as Rui et al.), each computation of an update to the list of scenes makes use of an "activity measure" of each video shot, defined so as to characterize the temporal information of the shot. According to equations (1) and (2) of Rui et al.:

$$Act_i = \frac{1}{N_i - 1} \sum_{k=1}^{N_i - 1} Diff_{k,k-1}$$

$$Diff_{k,k-1} = Dist(Hist(k), Hist(k-1))$$

where $Act_i$ and $N_i$ are the activity measure and number of frames for shot i; $Dif f_{k,k-1}$ is the color histogram difference between frames k and k−1; Hist(k) and Hist(k−1) are the color histograms for frames k and k−1; and Dist( ) is a distance measure between histograms. Carrying out this calculation for a long program with hundreds of shots is an extensive computation. However, since the activity measure of a video shot does not change between successive updates, at each new update activity measures need only be computed for shots that are new to the update. Actually, it is not only the calculation of the above equations that is saved, but also the calculation of the color histograms, which is an extensive task in and of itself.

The saving in computation when using periodic iterative processing is not limited to the physical level of shots and can be extended to the semantic level of scenes. This is true even though in some algorithms scenes are not preserved from cycle to cycle—the addition of several shots at the end of a portion of the program already divided into scenes might change the division into scenes. For example, if the original portion ends in scene A followed by scene B, and the added interval starts with a scene C that is found to be highly correlated with scene A, the processing algorithm may decide to merge all three scenes into one joint scene (as scenes are typically taken to be continuous).

However, in spite of this observation it is still possible to save in computation by using periodic iterative processing of the scenes which iteratively relies on results from a previous processing cycle. Specifically, when relating to the semantic scene level, many computation steps may iterate over the shots or the scenes while calculating various functions based on some metrics intended to represent similarities and differences of content. Most of the sub-steps of such computations are repeated from cycle to cycle and their results may be stored and re-used in the next cycle.

For example, equation (22) of Rui et al. requires the computing of $$\mathrm{max}SceneSim_i = \max_s\ SceneSim_{i,s}, s = 1, \ldots, numScenes$$

where $SceneSim_{i,s}$ is a similarity metric between shot i and scene s. This step compares a shot against all existing (already determined) scenes to find out to which scene it most naturally belongs. As most scenes identified at one update cycle remain valid and unchanged at the next cycle, most pairs of a scene and a shot have already been processed in a previous cycle, and therefore most of the processing of this computation step need not be repeated.

Therefore, while the most benefit from iteratively relying on results from a previous processing cycle is achieved for scene division algorithms in which scenes are preserved from cycle to cycle, it is still the case that iterative computations greatly reduce the required processing power and time even for scene division algorithms in which scenes are not preserved from cycle to cycle.

Reference is now made to FIGS. 1A and 1B, which are, respectively, a schematic block diagram of an embodiment of a system for providing flexible access to video scenes and a flow chart of a method for providing flexible access to video scenes, according to a first embodiment of the teachings herein. The system and method of FIGS. 1A and 1B relate to a situation where the server sends periodic updates to the client terminal of the user, so that an updated list of scenes may be provided to the user upon request of such a list of scenes, as described hereinabove with respect to exemplary scenario 3.

As seen in FIG. 1A, a system 100 for providing flexible access to video scenes to a user using a client terminal, includes a central server 102 and at least one client terminal 104, in communication with the central server 102. Each client terminal 104, here illustrated as a single client terminal, includes or may be associated with a display 106, and includes a processor 108 and a storage medium 110, which is typically a non-transitory computer readable storage medium. In some embodiments, the client terminal 104 may also include a local storage 111, for storing or buffering video content items and/or video scene information therein.

The central server 102 is adapted to provide to each client terminal 104 one or more video content items and/or one or more scene information collections. In some embodiments, the central server 102 is operated by a TV operator.

In some embodiments, the client terminal 104 is one of a TV set, a personal computer, a Set-Top-Box, a tablet, and a smartphone.

The storage medium 110 includes instructions to be executed by the processor 108, in order to carry out various steps of the method described herein below with respect to FIG. 1B. Specifically, the storage medium includes at least the following instructions:

instructions 112 to receive at least a portion of a video content item from the central server 102;

instructions 114 to play the at least a portion of the video content item;

instructions 116 to receive from the central server 102 a first scene information collection of the video content item. The first scene information collection includes scene information about at least a first video scene contained in the video content item;

instructions 118 to receive from the central server 102 a second scene information collection of the video content item. The second scene information collection is an updated scene information collection, and includes scene information about at least one scene contained in the video content item which was not contained in the first scene information collection;

instructions 120 to provide a first user interface enabling the user to select a single video scene from multiple video scenes contained in the video content item. The scenes which may be selected using the first user interface are included in the second scene information collection;

instructions 122 to receive from the user via the first user interface a selection of one video scene contained in the video content item; and instructions 124 to play the video scene selected by the user.

In some embodiments, the instructions 116 are to be carried out during playing of the video content item. In other words, the instructions 116 are to be carried out during carrying out of the instructions 114.

In some embodiments, the instructions 118 are to be carried out during playing of the video content item and after receiving the first scene information collection. In other words, the instructions 118 are to be carried out during carrying out of instructions 114 and subsequent to carrying out of instructions 116.

In some embodiments, the instructions 120 are to be carried out prior to completion of playing of the video content item and after receipt of the second scene information collection. In other words, the instructions 120 are to be carried out prior to completion of the execution of instructions 114 and subsequent to carrying out of instructions 118.

In some embodiments, central server 102 includes, or is associated with, a storage device 126. When generating the first scene information collection, at least some results of the generation process are stored in storage device 126. These results serve as input to the process for generating the second scene information collection, as described hereinabove.

A method of using the system of FIG. 1A is now described with respect to FIG. 1B.

As seen, at step 150, at least a portion of a video content item is received by the client terminal 104, executing instructions 112. The video content item, or the portion thereof, is provided to the client terminal by the central server 102. For example, the video content item may be a news program, as described in exemplary scenario 3 above.

At step 152, the client terminal 104 executes instructions 114 and plays the video content item, or the portion thereof that has been received from the central server 102.

At step 154, the client terminal 104 executes instructions 116 and receives from the central server 102 a first scene information collection. The first scene information collection includes scene information about one or more scenes of the video content item. In some embodiments, step 154 occurs while the client terminal 104 is playing the video content item. Returning to exemplary scenario 3, while the client terminal 104 is playing the news program, the client terminal receives a scene information collection including scene information for scenes already broadcast.

At step 156, the client terminal 104 executes instructions 118 and receives from the central server 102 a second scene information collection. The second scene information collection includes scene information about scenes of the video content item, and includes information about at least one scene which was not included in the first scene information collection.

In some embodiments, step 156 occurs while the client terminal 104 is playing the video content item. Additionally, step 156 is subsequent to step 154. Returning to exemplary scenario 3, while the client terminal 104 is playing the news program, and after the client terminal receives the first scene information collection, the client terminal receives an updated scene information collection.

In some embodiments, the second scene information collection includes all the information included in the first scene information collection, as well as scene information collection for at least one additional scene. Relating back to the example, the second scene information would include scene information for all the scenes already broadcast in the program, including all the scenes for which information was included in the first scene information collection. In such embodiments, a first group of scenes for which scene information is included in the first scene information collection, is a proper subgroup of a second group of scenes for which scene information is included in the second scene information collection.

In other embodiments, the second scene information collection may include information relating only to scenes for which information was not included in the first scene information collection. Relating back to the example, the second scene information collection may include scene information only for news items broadcast since the receipt of the first scene information collection.

In some embodiments, when the central server 102 generates the second scene information collection, it uses results from generating the first scene information collection, which were stored by the central server for such use, substantially as described hereinabove.

In some embodiments, the first scene information collection or the second scene information collection may include, for each specific scene included therein, one or more of a location of the specific scene within the video content item, a textual title of the specific scene, a thumbnail of the specific scene, and a length of the specific scene.

In some embodiments, the first scene information collection or the second scene information collection may be generated by the central server 102 in advance of delivery of the video content item to the client terminal 104 or in advance of playing of the video content item by the client terminal 104. In other embodiment, the first scene information collection or the second scene information collection may be generated in real time, while the video content item is played by the client terminal 104.

At step 158, before completion of playing of the video content item, the client terminal 104 executes instructions 120 and provides to the user a user interface. The user interface enables the user to select a single specific video scene from multiple scenes of the video content item. In some embodiments, the user interface includes a list or menu of scenes, which the user may select for playing. Specifically, the scenes which may be selected using the user interface include the scenes included in the second scene information collection. Stated differently, the user interface provides to the user the most updated list of scenes for selection of a desired scene for playing.

The user interface may provide any suitable identification of the scenes. For example, the user interface may provide any or all of a title of the scene, a thumbnail of the scene, and a location of the scene.

In some embodiments, the user interface may be provided visually, for example may be a menu displayed on a display 106 associated with the client terminal 104. In some embodiments, the user interface may be provided audibly, for example the titles of the scenes may be audible via a speaker system associated with the client terminal 104.

In some embodiments, the user interface may be provided responsive to a specific request from the user to provide the user interface. For example, the user may press a button on a remote control associated with client terminal 104, requesting to see a current list of scenes. In some embodiments, the user interface may be provided while playing of the video content item is paused. For example, the user may pause the currently playing scene, and request to see the list of scenes to see what scenes were played prior to the currently playing scene.

At step 160, the client terminal 104 executes instructions 122 and receives from the user, via the user interface, a selection of a single specific scene contained in the video content item. The selection may be provided by the user using any suitable device or means, such as by a remote controller associated with client terminal 104, as a voice command received via a microphone associated with client terminal 104, and the like.

In some embodiments, in which the second scene information collection is generated in real time and includes only scenes already played by client terminal 104, the specific scene is either a previously played scene or the currently playing scene. In other embodiments, in which the second scene information collection includes also scene information for future scenes, the selected specific scene may be a future scene not yet played by the client terminal 104.

At step 162, in response to receiving the user selection, the client terminal 104 executes instructions 124 and plays the scene selected by the user.

In some embodiments, the scene is stored in local storage 111 of the client terminal 104, and is played from the local storage. For example, the client terminal may locally store all the scenes of the video content item already played, and as such if the scene is a previously played scene, it may be played directly from the local storage.

In other embodiments, once the user selection is received, the client terminal 104 requests from the central server 102 data of the selected scene, and plays the scene upon receipt of the data from the central server.

Figure 2B:
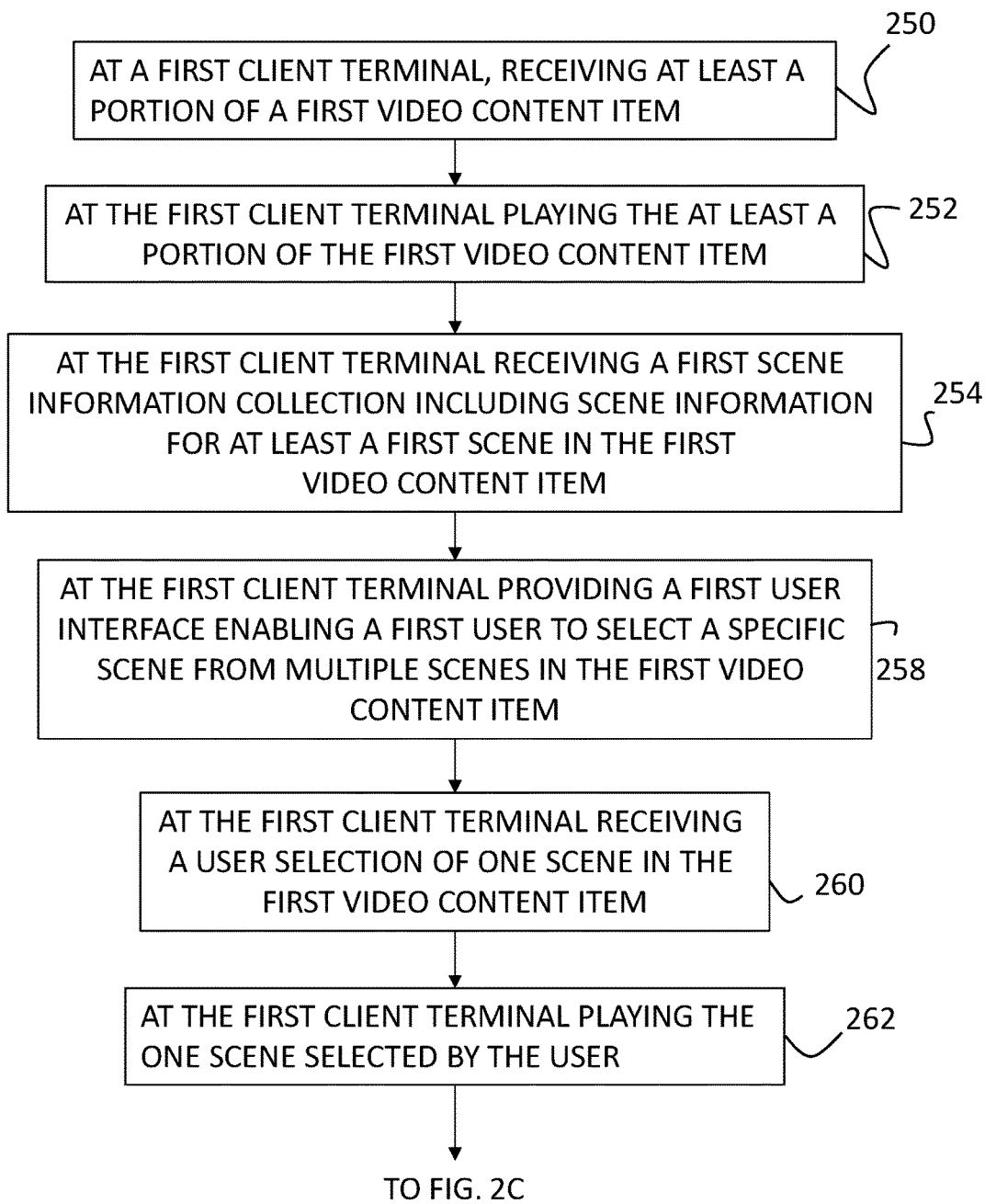
FIG. 2A is a schematic block diagram of an embodiment of a system for providing flexible access to video scenes according to a second embodiment of the teachings herein, and FIGS. 2B and 2C together are a flow chart of a method for providing flexible access to video scenes according to the second embodiment of the teachings herein.
Figure 2C:
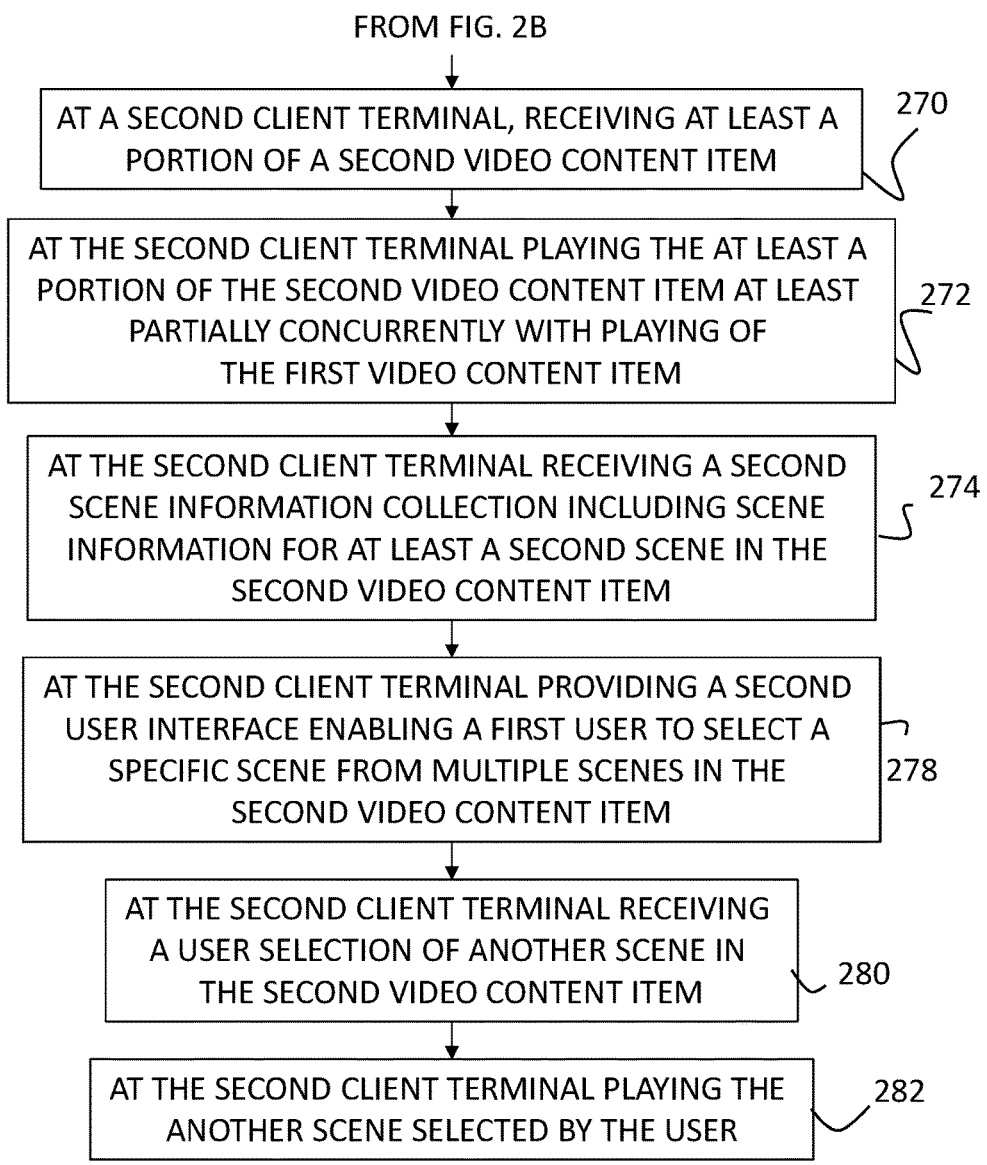

Reference is now made to FIG. 2A, which is a schematic block diagram of an embodiment of a system for providing flexible access to video scenes according to a second embodiment of the teachings herein, and to FIGS. 2B and 2C, which together are a flow chart of a method for providing flexible access to video scenes according to the second embodiment of the teachings herein. The system and method of FIGS. 2A to 2C relate to a situation where the server provides scene information to two different client terminals operated by two users, each client terminal playing a different video content item, and optionally even when the flexible access to video scenes is provided concurrently for the two client terminals.

As seen in FIG. 2A, a system 200 is designed for providing flexible access to video scenes of a first video content item to a first user using a first client terminal and to video scenes of a second video content item to a second user using a second client terminal 204b. It is appreciated that although the description herein relates to two users using two client terminals, the same system and method may be applicable to any number of users using any number of client terminals.

The system 200 includes a central server 202 and multiple client terminals, here illustrated as two client terminals 204a and 204b, both of which are in communication with the central server 202. Client terminal 204a includes or may be associated with a display 206a, and includes a processor 208a and a storage medium 210a, which is typically a non-transitory computer readable storage medium. In some embodiments, the client terminal 204a may also include a local storage 211a, for storing or buffering video content items and/or scene information therein. Similarly, client terminal 204b includes or may be associated with a display 206b, includes a processor 208b and a storage medium 210b, which is typically a non-transitory computer readable storage medium, and in some embodiments may include a local storage 211b.

The central server 202 is adapted to provide to each of client terminal 204a and 204b one or more video content items and/or one or more scene information collections. In the exemplary embodiment provided herein, central server 202 is adapted to provide to client terminal 204a a first video content item, and to provide to client terminals 204b a second video content item. The first and second video content items may be different from each other, or may be the same video content item. In some embodiments, the central server 202 is operated by a TV operator.

In some embodiments, each of client terminal 204a and 204b is one of a TV set, a personal computer, a Set-Top-Box, a tablet, and a smartphone.

The storage medium 210a includes instructions to be executed by the processor 208a, in order to carry out various steps of the method described herein below with respect to FIGS. 2B and 2C. Specifically, the storage medium 210a includes at least the following instructions:

instructions 212a to receive at least a portion of the first video content item from the central server 202;

instructions 214a to play the at least a portion of the first video content item;

instructions 216a to receive from the central server 202 a first scene information collection of the first video content item. The first scene information collection includes scene information about at least a first video scene contained in the first video content item;

instructions 220a to provide a first user interface enabling the first user to select a single video scene from multiple video scenes contained in the first video content item. The scenes which may be selected using the first user interface are included in the first scene information collection;

instructions 222a to receive from the first user via the first user interface a selection of one video scene contained in the first video content item; and instructions 224a to play the one video scene selected by the first user.

Similarly, the storage medium 210b includes instructions to be executed by the processor 208b, in order to carry out various steps of the method described herein below with respect to FIGS. 2B and 2C. Specifically, the storage medium 210b includes at least the following instructions:

instructions 212b to receive at least a portion of the second video content item from the central server 202;

instructions 214b to play the at least a portion of the second video content item;

instructions 216b to receive from the central server 202 a second scene information collection of the second video content item. The second scene information collection includes scene information about at least a second video scene contained in the second video content item;

instructions 220b to provide a second user interface enabling the second user to select a single video scene from multiple video scenes contained in the second video content item. The scenes which may be selected using the second user interface are included in the second scene information collection;

instructions 222b to receive from the second user via the second user interface a selection of another video scene contained in the second video content item; and instructions 224b to play the another video scene selected by the second user.

In some embodiments, the instructions 216a and 216b are to be carried out during playing of the first and second video content item. In other words, the instructions 216a and 216b are to be carried out during carrying out of the instructions 214a and 214b, respectively.

In some embodiments, the instructions 220a and 220b are to be carried out prior to completion of playing of the first and second video content items and after receipt of the first and second scene information collections. In other words, the instructions 220a and 220b are to be carried out prior to completing execution of instructions 214a and 214b and subsequent to carrying out of instructions 216a and 216b, respectively.

In some embodiments, central server 202 may include a storage device 226, which may be used when generating the first and second scene information collection, as described hereinabove.

A method of using the system of FIG. 2A is now described with respect to FIGS. 2B and 2C.

As seen, at step 250, at least a portion of the first video content item is received by the first client terminal 204a, executing instructions 212a. The first video content item, or the portion thereof, is provided to the first client terminal 204a by the central server 202.

At step 252, the first client terminal 204a executes instructions 214a and plays the first video content item, or the portion thereof that has been received from the central server 202.

At step 254, the first client terminal 204a executes instructions 216a and receives from the central server 202 a first scene information collection. The first scene information collection includes scene information about one or more scenes of the first video content item. In some embodiments, step 254 occurs while the first client terminal 204a is playing the first video content item.

In some embodiments, the first scene information collection may include, for each specific scene included therein, one or more of a location of the specific scene within the first video content item, a textual title of the specific scene, a thumbnail of the specific scene, and a length of the specific scene.

In some embodiments, the first scene information collection may be generated by the central server 202 in advance of delivery of the first video content item to the first client terminal 204a or in advance of playing of the first video content item by the first client terminal 204a. In other embodiments, the first scene information collection may be generated in real time, while the first video content item is played by the first client terminal 204a.

At step 258, before completion of playing of the first video content item, the first client terminal 204a executes instructions 220a and provides to the first user a first user interface. The first user interface enables the first user to select a single specific video scene from multiple scenes of the first video content item. In some embodiments, the first user interface includes a list or menu of scenes included in the first video content item, which the first user may select for playing. Specifically, the scenes which may be selected using the first user interface include the scenes included in the first scene information collection.

The first user interface may provide any suitable identification of the scenes. For example, the first user interface may provide any or all of a title of the scene, a thumbnail of the scene, and a location of the scene.

In some embodiments, the first user interface may be provided visually, for example may be a menu displayed on a display 206a associated with the first client terminal 204a. In some embodiments, the first user interface may be provided audibly, for example the titles of the scenes may be audible via a speaker system associated with the first client terminal 204a.

In some embodiments, the first user interface may be provided responsive to a specific request from the first user to provide the first user interface. For example, the first user may press a button on a remote control associated with first client terminal 204a, requesting to see a current list of scenes. In some embodiments, the first user interface may be provided while playing of the first video content item is paused.

At step 260, the first client terminal 204a executes instructions 222a and receives from the first user, via the first user interface, a selection of a single specific scene contained in the first video content item. The selection may be provided by the first user using any suitable device or means, such as by a remote controller associated with first client terminal 204a, as a voice command received via a microphone associated with first client terminal 204a, and the like.

In some embodiments, in which the first scene information collection is generated in real time and includes only scenes already played by first client terminal 204a, the specific scene is either a previously played scene or the currently playing scene. In other embodiments, in which the first scene information collection includes also scene information for future scenes, the selected specific scene may be a future scene not yet played by the client terminal 204a.

At step 262, in response to receiving the user selection from the first user, the client terminal 204a executes instructions 224a and plays the scene from the first video content item selected by the first user.

In some embodiments, the scene from the first video content item is stored in local storage 211a of the first client terminal 204a, and is played from the local storage. For example, the first client terminal may locally store all the scenes of the first video content item already played, and as such if the scene is a previously played scene, it may be played directly from the local storage.

In other embodiments, once the user selection is received, the first client terminal 204a requests from the central server 202 data of the selected scene, and plays the scene upon receipt of the data from the central server.

As seen, at step 270, at least a portion of the second video content item is received by the second client terminal 204b, executing instructions 212b. The second video content item, or the portion thereof, is provided to the second client terminal 204b by the central server 202. The second video content item may be different from the first video content item, or may be the same as the first video content item.

At step 272, the second client terminal 204b executes instructions 214b and plays the second video content item, or the portion thereof that has been received from the central server 202. Playing of the second video content item by second client terminal 204b may be at least partially concurrent with playing of the first video content item by first client terminal 204a.

At step 274, the second client terminal 204b executes instructions 216b and receives from the central server 202 a second scene information collection. The second scene information collection includes scene information about one or more scenes of the second video content item. In some embodiments, step 274 occurs while the second client terminal 204b is playing the second video content item.

In some embodiments, the second scene information collection may include, for each specific scene included therein, one or more of a location of the specific scene within the second video content item, a textual title of the specific scene, a thumbnail of the specific scene, and a length of the specific scene.

In some embodiments, the second scene information collection may be generated by the central server 202 in advance of delivery of the second video content item to the second client terminal 204b or in advance of playing of the second video content item by client terminal 204b. In other embodiments, the second scene information collection may be generated in real time, while the second video content item is played by the second client terminal 204b.

At step 278, before completion of playing of the second video content item, the second client terminal 204b executes instructions 220b and provides to the second user a second user interface. The second user interface enables the second user to select a single specific video scene from multiple scenes of the second video content item. In some embodiments, the second user interface includes a list or menu of scenes included in the second video content item, which the second user may select for playing. Specifically, the scenes which may be selected using the second user interface include the scenes included in the second scene information collection.

The second user interface may provide any suitable identification of the scenes. For example, the second user interface may provide any or all of a title of the scene, a thumbnail of the scene, and a location of the scene.

In some embodiments, the second user interface may be provided visually, for example may be a menu displayed on a display 206b associated with the second client terminal 204b. In some embodiments, the second user interface may be provided audibly, for example the titles of the scenes may be audible via a speaker system associated with the second client terminal 204b.

In some embodiments, the second user interface may be provided responsive to a specific request from the second user to provide the second user interface. For example, the second user may press a button on a remote control associated with second client terminal 204b, requesting to see a current list of scenes. In some embodiments, the second user interface may be provided while playing of the second video content item is paused.

At step 280, the second client terminal 204b executes instructions 222b and receives from the second user, via the second user interface, a selection of a single specific scene contained in the second video content item. The selection may be provided by the second user using any suitable device or means, such as by a remote controller associated with second client terminal 204b, as a voice command received via a microphone associated with second client terminal 204b, and the like.

In some embodiments, in which the second scene information collection is generated in real time and includes only scenes already played by second client terminal 204b, the specific scene is either a previously played scene or the currently playing scene. In other embodiments, in which the second scene information collection includes also scene information for future scenes, the selected specific scene may be a future scene not yet played by the client terminal 204b.

At step 282, in response to receiving the user selection from the second user, the client terminal 204b executes instructions 224b and plays the scene from the second video content item selected by the second user.

In some embodiments, the scene from the second video content item is stored in local storage 211b of the second client terminal 204b, and is played from the local storage. For example, the second client terminal may locally store all the scenes of the second video content item already played, and as such if the scene is a previously played scene, it may be played directly from the local storage.

In other embodiments, once the user selection is received, the second client terminal 204b requests from the central server 202 data of the selected scene, and plays the scene upon receipt of the data from the central server.

Figure 3A:
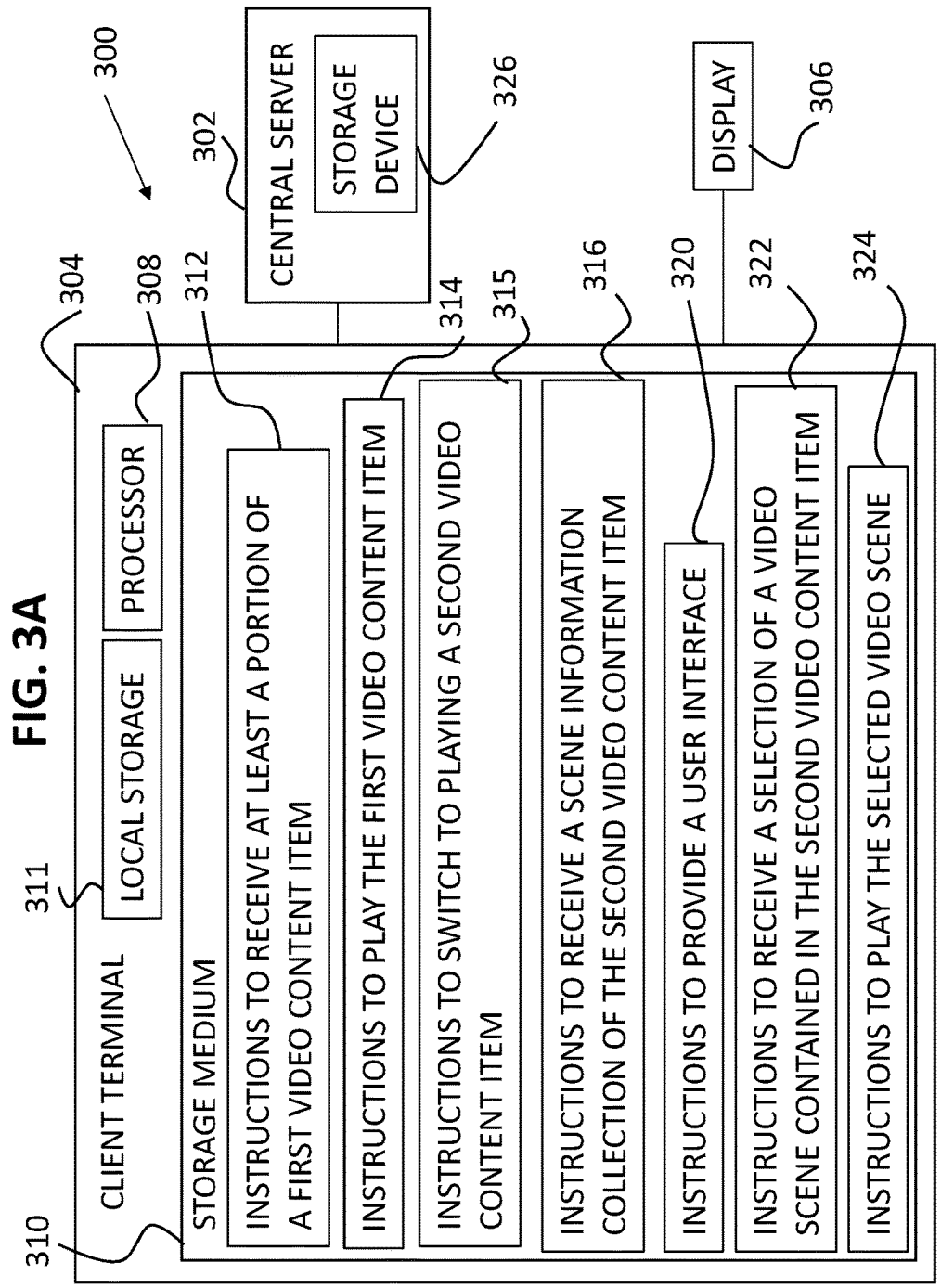

Reference is now made to FIGS. 3A and 3B, which are, respectively, a schematic block diagram of an embodiment of a system for providing flexible access to video scenes and a flow chart of a method for providing flexible access to video scenes, according to a third embodiment of the teachings herein. The system and method of FIGS. 3A and 3B relate to a situation where the user switches from watching a first video content item to watching a second video content item, and wants to easily access a scene of the second video content item, as described hereinabove with respect to exemplary scenarios 4 and 5.

As seen in FIG. 3A, a system 300 for providing flexible access to video scenes to a user using a client terminal, includes a central server 302 and a client terminal 304, in communication with the central server 302. Client terminal 304 includes or may be associated with a display 306, and includes a processor 308 and a storage medium 310, which is typically a non-transitory computer readable storage medium. In some embodiments, the client terminal 304 may also include a local storage 311, for storing or buffering video content items and/or scene information collections therein.

The central server 302 is adapted to provide to client terminal 304 one or more video content items and one or more scene information collections. In some embodiments, the central server 302 is operated by a TV operator.

In some embodiments, the client terminal 304 is one of a TV set, a personal computer, a Set-Top-Box, a tablet, and a smartphone.

The storage medium 310 includes instructions to be executed by the processor 308, in order to carry out various steps of the method described herein below with respect to FIG. 3B. Specifically, the storage medium includes at least the following instructions:

instructions 312 to receive at least a portion of a first video content item from the central server 302;

instructions 314 to play the at least a portion of the first video content item;

instructions 315 to switch from playing the first video content item to playing a second video content item;

instructions 316 to receive from the central server 302 a scene information collection of the second video content item. The scene information collection includes scene information about at least a first video scene contained in the second video content item;

instructions 320 to provide a user interface enabling the user to select a single video scene from multiple video scenes contained in the second video content item. The scenes which may be selected using the first user interface are included in the scene information collection;

instructions 322 to receive from the user via the user interface a selection of one video scene contained in the second video content item. The selection may be of a video scene in the second video content item which was not played by the client terminal 304 prior to switching, that is, a scene which was broadcast prior to execution of the instructions 315 to switch from playing the first video content item to playing the second video content item; and instructions 324 to play the video scene selected by the user.

In some embodiments, the instructions 315 include instructions to switch from playing a first TV channel to playing a second TV channel. In some embodiments, the instructions 315 include instructions to switch from playing a TV channel to playing a VOD video content item. In some embodiments, the instructions 315 include instructions to switch from playing a VOD video content item to playing a TV channel. In some embodiments, the instructions 315 include instructions to switch from playing a first VOD video content item to playing a second VOD video content item.

In some embodiments, the instructions 320 are to be carried out prior to completion of playing of the second video content item, and after receipt of the scene information collection. In other words, the instructions 320 are to be carried out subsequent to carrying out of instructions 316.

In some embodiments, central server 302 includes, or is associated with, a storage device 326. When generating the scene information collection, at least some results of the generation process are stored in storage device 326.

A method of using the system of FIG. 3A is now described with respect to FIG. 3B.

As seen, at step 350, at least a portion of a first video content item is received by the client terminal 304, executing instructions 312. The first video content item, or the portion thereof, is provided to the client terminal by the central server 302. For example, the video content item may be the arbitrary television channel of exemplary scenario 5 above.

At step 352, the client terminal 304 executes instructions 314 and plays the first video content item, or the portion thereof that has been received from the central server 302.

At step 353, the client terminal 304 executes instructions 315 and switches from playing the first video content item, or the portion thereof, to playing a second video content item. Typically, step 353 is carried out responsive to receipt of user instructions, such as the user clicking a button on a remote control associated with client terminal 304. Typically, step 353 includes receiving the second video content item, or a portion thereof, from the central server 302, in order to play the second video content item. In exemplary scenarios 4 and 5 above, step 353 is equivalent to the user zapping from the arbitrary TV channel to the news program.

In some embodiments, the switch may be from playing a first TV channel to playing a second TV channel. In some embodiments, the switch may be from playing a TV channel to playing a VOD video content item. In some embodiments, the switch may be from playing a VOD video content item to playing a TV channel. In some embodiments, the switch may be from playing a first VOD video content item to playing a second VOD video content item.

At step 354, the client terminal 304 executes instructions 316 and receives from the central server 302 a scene information collection. The scene information collection includes scene information about one or more scenes contained in the second video content item. In some embodiments, step 354 occurs while the client terminal 304 is playing the second video content item. Returning to exemplary scenarios 4 and 5, while the client terminal 304 is playing the news program, the client terminal receives a scene information collection including scene information for scenes already broadcast.

In some embodiments, the scene information collection may include, for each specific scene included therein, one or more of a location of the specific scene within the second video content item, a textual title of the specific scene, a thumbnail of the specific scene, and a length of the specific scene.

In some embodiments, the scene information collection may be generated by the central server 302 in advance of delivery of the second video content item to the client terminal 304 or in advance of playing of the second video content item by client terminal 304. In other embodiment, the scene information collection may be generated in real time, while the second video content item is played by the client terminal 304.

At step 358, before completion of playing of the second video content item, the client terminal 304 executes instructions 320 and provides to the user a user interface. The user interface enables the user to select a single specific video scene from multiple scenes of the second video content item. In some embodiments, the user interface includes a list or menu of scenes, which the user may select for playing. Specifically, the scenes which may be selected using the user interface include the scenes included in the scene information collection.

The user interface may provide any suitable identification of the scenes. For example, the user interface may provide any or all of a title of the scene, a thumbnail of the scene, and a location of the scene.

In some embodiments, the user interface may be provided visually, for example may be a menu displayed on a display 306 associated with the client terminal 304. In some embodiments, the user interface may be provided audibly, for example the titles of the scenes may be audible via a speaker system associated with the client terminal 304.

In some embodiments, the user interface may be provided while playing of the second video content item is paused. For example, the user may pause the currently playing scene, and request to see the list of scenes to see what scenes were played prior to the currently playing scene.

At step 360, the client terminal 304 executes instructions 322 and receives from the user, via the user interface, a selection of a single specific scene contained in the second video content item. The selection may be provided by the user using any suitable device or means, such as by a remote controller associated with client terminal 304, as a voice command received via a microphone associated with client terminal 304, and the like. In the exemplary scenarios 4 and 5, the selected scene is the news item relating to the archeological find.

In some embodiments, in which the scene information collection is generated in real time and includes only scenes already broadcast by central server 302, the selected specific scene is either a previously broadcast scene or the currently playing scene. Specifically, the selected specific scene may be one broadcast prior to switching to playing of the second video content item at step 353, such that the selected scene may be a scene which had not been played by the client terminal prior to its selection.

In other embodiments, in which the scene information collection includes also scene information for future scenes, the selected specific scene may also be a future scene not yet broadcast by central server 302.

At step 362, in response to receiving the user selection, the client terminal 304 executes instructions 324 and plays the scene selected by the user.

In some embodiments, the scene is stored in local storage 311 of the client terminal 304, and is played from the local storage. For example, the client terminal may locally store all the scenes of the second video content item already played, and as such if the scene is a previously played scene, it may be played directly from the local storage.

In other embodiments, once the user selection is received, the client terminal 304 requests from the central server 302 data of the selected scene, and plays the scene upon receipt of the data from the central server.

Figure 4B:
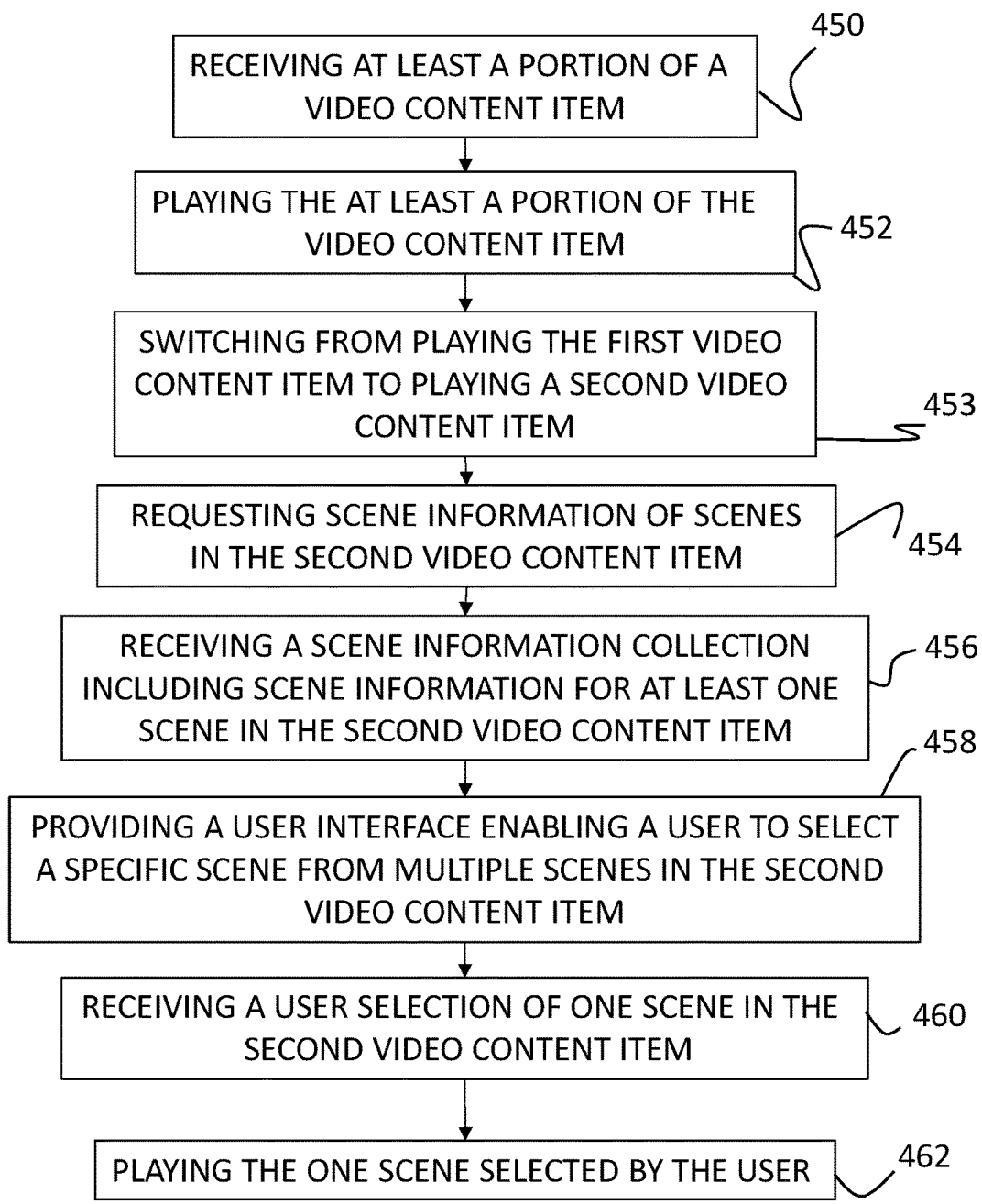

Reference is now made to FIGS. 4A and 4B, which are, respectively, a schematic block diagram of an embodiment of a system for providing flexible access to video scenes and a flow chart of a method for providing flexible access to video scenes, according to a fourth embodiment of the teachings herein. The system and method of FIGS. 4A and 4B relate to a situation where the user switches from watching a first video content item to watching a second video content item, and immediately upon switching requests a list of scenes of the second video content item.

As seen in FIG. 4A, a system 400 for providing flexible access to video scenes to a user using a client terminal, includes a central server 402 and a client terminal 404, in communication with the central server 402. Client terminal 404 includes or may be associated with a display 406, and includes a processor 408 and a storage medium 410, which is typically a non-transitory computer readable storage medium. In some embodiments, the client terminal 404 may also include a local storage 411, for storing or buffering video content items and/or video scene information therein.

The central server 402 is adapted to provide to client terminal 404 one or more video content items and/or one or more scene information collections. In some embodiments, the central server 402 is operated by a TV operator.

In some embodiments, the client terminal 404 is one of a TV set, a personal computer, a Set-Top-Box, a tablet, and a smartphone.

The storage medium 410 includes instructions to be executed by the processor 408, in order to carry out various steps of the method described herein below with respect to FIG. 4B. Specifically, the storage medium includes at least the following instructions:

instructions 412 to receive at least a portion of a first video content item from the central server 402;

instructions 414 to play the at least a portion of the first video content item;

instructions 415 to switch from playing the first video content item to playing a second video content item;

instructions 416 to request from the central server 402 scene information of the second video content item;

instructions 418 to receive from the central server 402 a scene information collection of the second video content item. The scene information collection includes scene information about at least a first video scene contained in the second video content item;

instructions 420 to provide a user interface enabling the user to select a single video scene from multiple video scenes contained in the second video content item. The scenes which may be selected using the first user interface are included in the scene information collection;

instructions 422 to receive from the user via the user interface a selection of one video scene contained in the second video content item; and instructions 424 to play the video scene selected by the user.

In some embodiments, the instructions 415 include instructions to switch from playing a first TV channel to playing a second TV channel. In some embodiments, the instructions 415 include instructions to switch from playing a TV channel to playing a VOD video content item. In some embodiments, the instructions 415 include instructions to switch from playing a VOD video content item to playing a TV channel. In some embodiments, the instructions 415 include instructions to switch from playing a first VOD video content item to playing a second VOD video content item.

In some embodiments, the instructions 416 are to be carried out following carrying out of the instructions 415. In other words, the scene information is to be requested following switching to playing the second video content item.

In some embodiments, the instructions 418 are to be carried out in response to carrying out of the instructions 416. In other words, the scene information collection is to be received in response to the request for scene information.

In some embodiments, the instructions 420 are to be carried out prior to completion of playing of the second video content item, and after receipt of the scene information collection. In other words, the instructions 420 are to be carried out subsequent to carrying out of instructions 418.

In some embodiments, central server 402 includes, or is associated with, a storage device 426. When generating the scene information collection, at least some results of the generation process are stored in storage device 426.

A method of using the system of FIG. 4A is now described with respect to FIG. 4B.

As seen, at step 450, at least a portion of a first video content item is received by the client terminal 404, executing instructions 412. The first video content item, or the portion thereof, is provided to the client terminal by the central server 402. For example, the video content item may be the arbitrary television channel of exemplary scenario 5 above.

At step 452, the client terminal 404 executes instructions 414 and plays the first video content item, or the portion thereof that has been received from the central server 402.

At step 453, the client terminal 404 executes instructions 415 and switches from playing the first video content item, or the portion thereof, to playing a second video content item. Typically, step 453 is carried out responsive to receipt of user instructions, such as the user clicking a button on a remote control associated with client terminal 404. Typically, step 453 includes receiving the second video content item, or a portion thereof, from the central server 402, in order to play the second video content item.

In some embodiments, the switch may be from playing a first TV channel to playing a second TV channel. In some embodiments, the switch may be from playing a TV channel to playing a VOD video content item. In some embodiments, the switch may be from playing a VOD video content item to playing a TV channel. In some embodiments, the switch may be from playing a first VOD video content item to playing a second VOD video content item.

At step 454, following switching to playing the second video content item, the client terminal 404 executes instruction 416 and requests from the central server scene information relating to scenes of the second video content item. In some embodiments, such request is responsive to instructions provided by the user, for example using a remote controller associated with client terminal 404.

At step 456, the client terminal 404 executes instructions 418 and receives from the central server 402 a scene information collection. The scene information collection includes scene information about one or more scenes contained in the second video content item. In some embodiments, step 456 occurs while the client terminal 404 is playing the second video content item.

In some embodiments, the scene information collection may include, for each specific scene included therein, one or more of a location of the specific scene within the second video content item, a textual title of the specific scene, a thumbnail of the specific scene, and a length of the specific scene.

In some embodiments, the scene information collection may be generated by the central server 402 in advance of delivery of the second video content item to the client terminal 404 or in advance of playing of the second video content item by client terminal 404. In other embodiment, the scene information collection may be generated in real time, while the second video content item is played by the client terminal 404.

At step 458, before completion of playing of the second video content item, the client terminal 404 executes instructions 420 and provides to the user a user interface. The user interface enables the user to select a single specific video scene from multiple scenes of the second video content item. In some embodiments, the user interface includes a list or menu of scenes, which the user may select for playing. Specifically, the scenes which may be selected using the user interface include the scenes included in the scene information collection.

The user interface may provide any suitable identification of the scenes. For example, the user interface may provide any or all of a title of the scene, a thumbnail of the scene, and a location of the scene.

In some embodiments, the user interface may be provided visually, for example may be a menu displayed on a display 406 associated with the client terminal 404. In some embodiments, the user interface may be provided audibly, for example the titles of the scenes may be audible via a speaker system associated with the client terminal 404.

In some embodiments, the user interface may be provided while playing of the second video content item is paused. For example, the user may pause the currently playing scene, and request to see the list of scenes to see what scenes were played prior to the currently playing scene.

At step 460, the client terminal 404 executes instructions 422 and receives from the user, via the user interface, a selection of a single specific scene contained in the second video content item. The selection may be provided by the user using any suitable device or means, such as by a remote controller associated with client terminal 404, as a voice command received via a microphone associated with client terminal 404, and the like.

In some embodiments, in which the scene information collection is generated in real time and includes only scenes already broadcast by central server 402, the selected specific scene is either a previously broadcast scene or the currently playing scene. Specifically, the selected specific scene may be one broadcast prior to switching to playing of the second video content item at step 453, such that the selected scene may be a scene which had not been played by the client terminal prior to its selection.

In other embodiments, in which the scene information collection includes also scene information for future scenes, the selected specific scene may also be a future scene not yet broadcast by central server 402.

At step 462, in response to receiving the user selection, the client terminal 404 executes instructions 424 and plays the scene selected by the user.

In some embodiments, the scene is stored in local storage 411 of the client terminal 404, and is played from the local storage. For example, the client terminal may locally store all the scenes of the second video content item already played, and as such if the scene is a previously played scene, it may be played directly from the local storage.

In other embodiments, once the user selection is received, the client terminal 404 requests from the central server 402 data of the selected scene, and plays the scene upon receipt of the data from the central server.

Figure 5A:
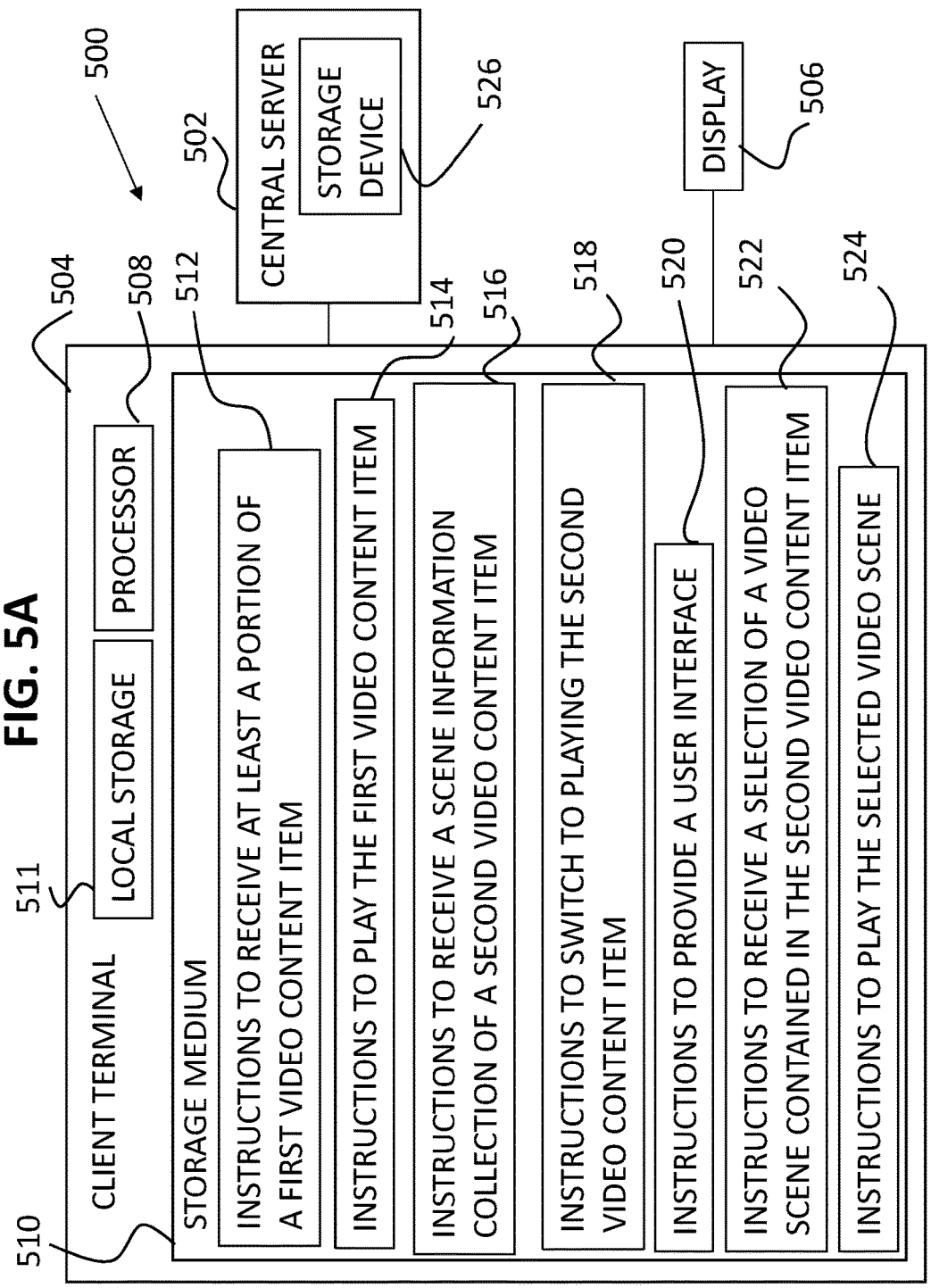

Reference is now made to FIGS. 5A and 5B, which are, respectively, a schematic block diagram of an embodiment of a system for providing flexible access to video scenes and a flow chart of a method for providing flexible access to video scenes, according to a fifth embodiment of the teachings herein. The system and method of FIGS. 5A and 5B relate to a situation where the user switches from watching a first video content item to watching a second video content item, and scene information for the second video content item is provided by the central server to the client terminal of the user prior to such switching.

As seen in FIG. 5A, a system 500 for providing flexible access to video scenes to a user using a client terminal, includes a central server 502 and a client terminal 504, in communication with the central server 502. Client terminal 504 includes or may be associated with a display 506, and includes a processor 508 and a storage medium 510, which is typically a non-transitory computer readable storage medium. In some embodiments, the client terminal 504 may also include a local storage 511, for storing or buffering video content items and/or scene information collections therein.

The central server 502 is adapted to provide to client terminal 504 one or more video content items and/or scene information collections. In some embodiments, the central server 502 is operated by a TV operator.

In some embodiments, the client terminal 504 is one of a TV set, a personal computer, a Set-Top-Box, a tablet, and a smartphone.

The storage medium 510 includes instructions to be executed by the processor 508, in order to carry out various steps of the method described herein below with respect to FIG. 5B. Specifically, the storage medium includes at least the following instructions:

instructions 512 to receive at least a portion of a first video content item from the central server 502;

instructions 514 to play the at least a portion of the first video content item;

instructions 516 to receive from the central server 502 a scene information collection of a second video content item. The scene information collection includes scene information about at least a first video scene contained in the second video content item;

instructions 518 to switch from playing the first video content item to playing the second video content item;

instructions 520 to provide a user interface enabling a user to select a single video scene from multiple video scenes contained in the second video content item. The scenes which may be selected using the first user interface are included in the scene information collection;

instructions 522 to receive from the user via the user interface a selection of one video scene contained in the second video content item; and instructions 524 to play the video scene selected by the user.

In some embodiments, the instructions 516 are to be carried out during execution of the instructions 514. In other words, the scene information collection of the second video content item is to be received during playing of the first video content item.

In some embodiments, the instructions 518 include instructions to switch from playing a first TV channel to playing a second TV channel. In some embodiments, the instructions 518 include instructions to switch from playing a TV channel to playing a VOD video content item. In some embodiments, the instructions 518 include instructions to switch from playing a VOD video content item to playing a TV channel. In some embodiments, the instructions 518 include instructions to switch from playing a first VOD video content item to playing a second VOD video content item.

In some embodiments, the instructions 518 are to be carried out subsequent to instructions 516, such that switching to play the second video content item occurs after receiving the scene information collection of the second video content item.

In some embodiments, the instructions 520 are to be carried out prior to completion of playing of the second video content item, and after receipt of the scene information collection. In other words, the instructions 520 are to be carried out subsequent to carrying out of instructions 516.

In some embodiments, central server 502 includes, or is associated with, a storage device 526. When generating the scene information collection, at least some results of the generation process are stored in storage device 526.

A method of using the system of FIG. 5A is now described with respect to FIG. 5B.

As seen, at step 550, at least a portion of a first video content item is received by the client terminal 504, executing instructions 512. The first video content item, or the portion thereof, is provided to the client terminal by the central server 502. For example, the video content item may be the arbitrary television channel of exemplary scenario 5 above.

At step 552, the client terminal 504 executes instructions 514 and plays the first video content item, or the portion thereof that has been received from the central server 502.

At step 554, and during playing of the first video content item, the client terminal 504 executes instructions 516 and receives from the central server 502 a scene information collection including scene information about one or more scenes contained in the second video content item.

In some embodiments, the scene information collection may include, for each specific scene included therein, one or more of a location of the specific scene within the second video content item, a textual title of the specific scene, a thumbnail of the specific scene, and a length of the specific scene.

At step 556, the client terminal 504 executes instructions 518 and switches from playing the first video content item, or the portion thereof, to playing a second video content item. Typically, step 556 is carried out responsive to receipt of user instructions, such as the user clicking a button on a remote control associated with client terminal 504. Typically, step 556 includes receiving the second video content item, or a portion thereof, from the central server 502, in order to play the second video content item.

In some embodiments, the switch may be from playing a first TV channel to playing a second TV channel. In some embodiments, the switch may be from playing a TV channel to playing a VOD video content item. In some embodiments, the switch may be from playing a VOD video content item to playing a TV channel. In some embodiments, the switch may be from playing a first VOD video content item to playing a second VOD video content item.

At step 558, before completion of playing of the second video content item, the client terminal 504 executes instructions 520 and provides to the user a user interface. The user interface enables the user to select a single specific video scene from multiple scenes of the second video content item. In some embodiments, the user interface includes a list or menu of scenes, which the user may select for playing. Specifically, the scenes which may be selected using the user interface include the scenes included in the scene information collection.

The user interface may provide any suitable identification of the scenes. For example, the user interface may provide any or all of a title of the scene, a thumbnail of the scene, and a location of the scene.

In some embodiments, the user interface may be provided visually, for example may be a menu displayed on a display 506 associated with the client terminal 504. In some embodiments, the user interface may be provided audibly, for example the titles of the scenes may be audible via a speaker system associated with the client terminal 504.

In some embodiments, the user interface may be provided while playing of the second video content item is paused. For example, the user may pause the currently playing scene, and request to see the list of scenes to see what scenes were played prior to the currently playing scene.

At step 560, the client terminal 504 executes instructions 522 and receives from the user, via the user interface, a selection of a single specific scene contained in the second video content item. The selection may be provided by the user using any suitable device or means, such as by a remote controller associated with client terminal 504, as a voice command received via a microphone associated with client terminal 504, and the like. In the exemplary scenarios 4 and 5, the selected scene is the news item relating to the archeological find.

In some embodiments, in which the scene information collection is generated in real time and includes only scenes already broadcast by central server 502, the selected specific scene is either a previously broadcast scene or the currently playing scene. Specifically, the selected specific scene may be one broadcast prior to switching to playing of the second video content item at step 556, such that the selected scene may be a scene which had not been played by the client terminal prior to its selection.

In other embodiments, in which the scene information collection includes also scene information for future scenes, the selected specific scene may also be a future scene not yet broadcast by central server 502.

At step 562, in response to receiving the user selection, the client terminal 504 executes instructions 524 and plays the scene selected by the user.

In some embodiments, the scene is stored in local storage 511 of the client terminal 504, and is played from the local storage. For example, the client terminal may locally store all the scenes of the second video content item already played, and as such if the scene is a previously played scene, it may be played directly from the local storage.

In other embodiments, once the user selection is received, the client terminal 504 requests from the central server 502 data of the selected scene, and plays the scene upon receipt of the data from the central server.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The following United States published patent applications are incorporated herein by reference in their entirety: United States Patent Publication 20170099526, United States Patent Publication 20170099485, United States Patent Publication 20170091556, United States Patent Publication 20160379373, United States Patent Publication 20160372158, United States Patent Publication 20160371992, United States Patent Publication 20160180379, United States Patent Publication 20160150222, United States Patent Publication 20160063087, United States Patent Publication 20160057175, United States Patent Publication 20160029035, United States Patent Publication 20160014433, United States Patent Publication 20150161450, United States Patent Publication 20150131861, United States Patent Publication 20150086067, United States Patent Publication 20150057995, United States Patent Publication 20150007005, United States Patent Publication 20140376618, United States Patent Publication 20140375888, United States Patent Publication 20140307050, United States Patent Publication 20140304597, United States Patent Publication 20140282711, United States Patent Publication 20140270507, United States Patent Publication 20140269927, United States Patent Publication 20140267918, United States Patent Publication 20140247392, United States Patent Publication 20140153640, United States Patent Publication 20140127664, United States Patent Publication 20140115639, United States Patent Publication 20140104293, United States Patent Publication 20140104245, United States Patent Publication 20140093164, United States Patent Publication 20140009577, United States Patent Publication 20140002742, United States Patent Publication 20130340001, United States Patent Publication 20130325972, United States Patent Publication 20130322765, United States Patent Publication 20130272573, United States Patent Publication 20130235275, United States Patent Publication 20130166303, United States Patent Publication 20130144727, United States Patent Publication

| | | | | | | | | |
|---|---|---|---|---|---|---|---|---|
| 20130141647, | United | States | Patent | Publication | 20070086664, | United | States | Patent | Publication |
| 20130120410, | United | States | Patent | Publication | 20070047911, | United | States | Patent | Publication |
| 20130113999, | United | States | Patent | Publication | 20070003217, | United | States | Patent | Publication |
| 20130104191, | United | States | Patent | Publication | 20060251385, | United | States | Patent | Publication |
| 20130016877, | United | States | Patent | Publication | 20060251382, | United | States | Patent | Publication |
| 20120314027, | United | States | Patent | Publication | 20060245199, | United | States | Patent | Publication |
| 20120249870, | United | States | Patent | Publication | 20060165283, | United | States | Patent | Publication |
| 20120218288, | United | States | Patent | Publication | 20060140264, | United | States | Patent | Publication |
| 20120210227, | United | States | Patent | Publication | 20060127057, | United | States | Patent | Publication |
| 20120195370, | United | States | Patent | Publication | 20060117040, | United | States | Patent | Publication |
| 20120195369, | United | States | Patent | Publication | 20060095847, | United | States | Patent | Publication |
| 20120150990, | United | States | Patent | Publication | 20060031216, | United | States | Patent | Publication |
| 20120148089, | United | States | Patent | Publication | 20050288939, | United | States | Patent | Publication |
| 20120114233, | United | States | Patent | Publication | 20050281535, | United | States | Patent | Publication |
| 20110235720, | United | States | Patent | Publication | 20050201623, | United | States | Patent | Publication |
| 20110225196, | United | States | Patent | Publication | 20050198067, | United | States | Patent | Publication |
| 20110216836, | United | States | Patent | Publication | 20050080840, | United | States | Patent | Publication |
| 20110206351, | United | States | Patent | Publication | 20050071889, | United | States | Patent | Publication |
| 20110205330, | United | States | Patent | Publication | 20050068204, | United | States | Patent | Publication |
| 20110135278, | United | States | Patent | Publication | 20050060757, | United | States | Patent | Publication |
| 20110069146, | United | States | Patent | Publication | 20050054407, | United | States | Patent | Publication |
| 20110051010, | United | States | Patent | Publication | 20050031211, | United | States | Patent | Publication |
| 20100260376, | United | States | Patent | Publication | 20040252516, | United | States | Patent | Publication |
| 20100208205, | United | States | Patent | Publication | 20040246259, | United | States | Patent | Publication |
| 20100174733, | United | States | Patent | Publication | 20040240847, | United | States | Patent | Publication |
| 20100104255, | United | States | Patent | Publication | 20040228616, | United | States | Patent | Publication |
| 20100091182, | United | States | Patent | Publication | 20040194020, | United | States | Patent | Publication |
| 20100083336, | United | States | Patent | Publication | 20040189667, | United | States | Patent | Publication |
| 20100070523, | United | States | Patent | Publication | 20040189645, | United | States | Patent | Publication |
| 20100066914, | United | States | Patent | Publication | 20040146272, | United | States | Patent | Publication |
| 20100045775, | United | States | Patent | Publication | 20040146108, | United | States | Patent | Publication |
| 20100007793, | United | States | Patent | Publication | 20040133569, | United | States | Patent | Publication |
| 20090234862, | United | States | Patent | Publication | 20040125877, | United | States | Patent | Publication |
| 20090226046, | United | States | Patent | Publication | 20040093220, | United | States | Patent | Publication |
| 20090219986, | United | States | Patent | Publication | 20040048642, | United | States | Patent | Publication |
| 20090201320, | United | States | Patent | Publication | 20040022313, | United | States | Patent | Publication |
| 20090179894, | United | States | Patent | Publication | 20030220838, | United | States | Patent | Publication |
| 20090169065, | United | States | Patent | Publication | 20030128969, | United | States | Patent | Publication |
| 20090157407, | United | States | Patent | Publication | 20030126604, | United | States | Patent | Publication |
| 20090153744, | United | States | Patent | Publication | 20030096643, | United | States | Patent | Publication |
| 20090142030, | United | States | Patent | Publication | 20030093810, | United | States | Patent | Publication |
| 20090128550, | United | States | Patent | Publication | 20030016240, | United | States | Patent | Publication |
| 20090096864, | United | States | Patent | Publication | 20030001903, | United | States | Patent | Publication |
| 20090064267, | United | States | Patent | Publication | 20030001846, | United | States | Patent | Publication |
| 20090055884, | United | States | Patent | Publication | 20020194197, | United | States | Patent | Publication |
| 20090040390, | United | States | Patent | Publication | 20020186252, | United | States | Patent | Publication |
| 20090027383, | United | States | Patent | Publication | 20020130976, | United | States | Patent | Publication |
| 20090025051, | United | States | Patent | Publication | 20020108112, | United | States | Patent | Publication |
| 20080316307, | United | States | Patent | Publication | 20020082081, | United | States | Patent | Publication |
| 20080266319, | United | States | Patent | Publication | 20020065928, | United | States | Patent | Publication |
| 20080195924, | United | States | Patent | Publication | 20020057739, | United | States | Patent | Publication |
| 20080131072, | United | States | Patent | Publication | 20010052899, | and | United States | Patent | Publication |
| 20080107343, | United | States | Patent | Publication | 20010003468. | | | | |
| 20080063065, | United | States | Patent | Publication | | | | | |
| 20080018503, | United | States | Patent | Publication | | | | | |
| 20080013619, | United | States | Patent | Publication | | | | | |
| 20070299870, | United | States | Patent | Publication | | | | | |
| 20070291986, | United | States | Patent | Publication | | | | | |
| 20070239447, | United | States | Patent | Publication | | | | | |
| 20070223880, | United | States | Patent | Publication | | | | | |
| 20070204310, | United | States | Patent | Publication | | | | | |
| 20070203968, | United | States | Patent | Publication | | | | | |
| 20070201558, | United | States | Patent | Publication | | | | | |
| 20070185857, | United | States | Patent | Publication | | | | | |
| 20070153692, | United | States | Patent | Publication | | | | | |
| 20070094602, | United | States | Patent | Publication | | | | | |
| 20070086665, | United | States | Patent | Publication | | | | | |

The invention claimed is:

1. In a system comprising a central server and at least one client terminal, wherein the central server provides linear TV channels that include video content items to each one of the at least one client terminal, a method for providing to a user of a first client terminal of the at least one client terminal flexible access to video scenes contained within video content items included in linear TV channels provided by the central server to the first client terminal, the method comprising:

a. receiving, by the first client terminal and from the central server, a first linear TV channel including at least a portion of a first video content item;

b. playing, by the first client terminal, the first linear TV channel, thereby playing the at least a portion of the first video content item;
c. switching, by the first client terminal, from playing the first linear TV channel to playing a second linear TV channel including a second video content item, thereby playing the second video content item;
d. at the first client terminal, receiving from the central server a scene information collection of the second video content item, wherein the scene information collection of the second video content item comprises scene information about at least a first video scene contained in the second video content item, the scene information collection of the second video content item being generated by the central server while the first client terminal is playing the second video content item;
e. providing, by the first client terminal and before the first client terminal finishes to play the second video content item, a user interface enabling the user of the first client terminal to select a single video scene from multiple video scenes contained in the second video content item, wherein the providing is subsequent to the receiving the scene information collection and wherein the multiple video scenes which may be selected using the user interface are based on the scene information collection;
f. receiving, by the first client terminal, a selection of one video scene contained in the second video content item, wherein the one video scene contained in the second video content item was not played by the first client terminal following the switching, the selection provided by the user using the user interface; and
g. subsequent to and in response to the receiving of the selection, playing the one video scene by the first client terminal.

2. The method of claim 1, wherein the providing the user interface by the first client terminal includes providing the user interface while the second video content item is paused by the first client terminal.

3. In a system comprising a central server and at least one client terminal, wherein the central server provides linear TV channels that include video content items to each one of the at least one client terminal, a method for providing to a user of a first client terminal of the at least one client terminal flexible access to video scenes contained within video content items included in linear TV channels provided by the central server to the first client terminal, the method comprising:
a. receiving, by the first client terminal and from the central server, a first linear TV channel including at least a portion of a first video content item;
b. playing, by the first client terminal, the first linear TV channel, thereby playing the at least a portion of the first video content item;
c. switching, by the first client terminal, from playing the first linear TV channel to playing a second linear TV channel including a second video content item, thereby playing the second video content item;
d. in response to the switching, requesting, by the first client terminal and from the central server, scene information of the second video content item;
e. at the first client terminal and in response to the requesting, receiving from the central server a scene information collection of the second video content item, wherein the scene information collection of the second video content item comprises scene information about at least a first video scene contained in the second video content item, the scene information collection of the second video content item being generated by the central server while the first client terminal is playing the second video content item;
f. providing, by the first client terminal and before the first client terminal finishes to play the second video content item, a user interface enabling the user of the first client terminal to select a single video scene from multiple video scenes contained in the second video content item, wherein the providing is subsequent to the receiving the scene information collection and wherein the multiple video scenes which may be selected using the user interface are based on the scene information collection;
g. receiving, by the first client terminal, a selection of one video scene contained in the second video content item, the selection provided by the user using the user interface; and
h. subsequent to and in response to the receiving of the selection, playing the one video scene by the first client terminal.

4. In a system comprising a central server and at least one client terminal, wherein the central server provides linear TV channels that include video content items to each one of the at least one client terminal, a method for providing to a user of a first client terminal of the at least one client terminal flexible access to video scenes contained within video content items included in linear TV channels provided by the central server to the first client terminal, the method comprising:
a. receiving, by the first client terminal and from the central server, a first linear TV channel including at least a portion of a first video content item;
b. playing, by the first client terminal, the first linear TV channel, thereby playing the at least a portion of the first video content item;
c. at the first client terminal and while the first client terminal is playing the first linear TV channel, receiving from the central server a scene information collection of a second video content item included in a second linear TV channel, wherein the scene information collection of the second video content item comprises scene information about at least a first video scene contained in the second video content item, the scene information collection of the second video content item being generated by the central server while the first client terminal is playing the first video content item;
d. storing, at the first client terminal and subsequent to the receiving the scene information collection, at least a portion of the scene information collection of the second video content item;
e. switching, by the first client terminal and subsequent to the storing the at least a portion of the scene information collection of the second video content item, from playing the first linear TV channel to playing the second linear TV channel, thereby playing the second video content item;
f. providing, by the first client terminal, based on the stored at least a portion of the scene information collection, and before the first client terminal finishes to play the second video content item, a user interface enabling the user of the first client terminal to select a single video scene from multiple video scenes contained in the second video content item, wherein the providing is subsequent to the switching and prior to receiving by the first client terminal of any additional scene information collection of the second video content item, and wherein the multiple video scenes which may be selected using the user interface are based on the scene information collection;

g. receiving, by the first client terminal, a selection of one video scene contained in the second video content item, the selection provided by the user using the user interface; and h. subsequent to and in response to the receiving of the selection, playing the one video scene by the first client terminal.

* * * * *